United States Patent
Dewagamage et al.

(10) Patent No.: US 9,066,274 B2
(45) Date of Patent: Jun. 23, 2015

(54) CONTROL APPARATUS, CONTROL METHOD, AND MOBILE COMMUNICATION SYSTEM

(71) Applicant: FUJITSU LIMITED, Kawasaki-shi (JP)

(72) Inventors: Danasiri Wijedasa Dewagamage, Kawasaki (JP); Masato Katori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 13/776,078

(22) Filed: Feb. 25, 2013

(65) Prior Publication Data

US 2013/0165125 A1  Jun. 27, 2013

Related U.S. Application Data

(63) Continuation of application No. PCT/JP2010/064950, filed on Sep. 1, 2010.

(51) Int. Cl.
| | |
|---|---|
| *H04W 36/00* | (2009.01) |
| *H04W 36/30* | (2009.01) |
| *H04W 16/08* | (2009.01) |
| *H04W 52/24* | (2009.01) |
| H04W 36/04 | (2009.01) |
| H04W 84/04 | (2009.01) |

(52) U.S. Cl.
CPC .............. *H04W 36/30* (2013.01); *H04W 16/08* (2013.01); *H04W 36/04* (2013.01); *H04W 84/045* (2013.01); *Y02B 60/50* (2013.01); *H04W 52/244* (2013.01)

(58) Field of Classification Search
USPC .................................. 455/437, 444, 522, 436
See application file for complete search history.

(56) References Cited

U.S. PATENT DOCUMENTS

| | | | |
|---|---|---|---|
| 6,473,624 B1 * | 10/2002 | Corbett et al. ................. | 455/522 |
| 7,190,957 B2 * | 3/2007 | Okawa et al. .................. | 455/436 |
| 7,929,970 B1 * | 4/2011 | Gunasekara et al. .......... | 455/444 |

(Continued)

FOREIGN PATENT DOCUMENTS

| | | |
|---|---|---|
| EP | 2217028 A1 | 8/2010 |
| EP | 2315477 | 4/2011 |

(Continued)

OTHER PUBLICATIONS

International Search Report, mailed in connection with PCT/JP2010/064950 and mailed Oct. 26, 2010.

(Continued)

*Primary Examiner* — Kamran Afshar
*Assistant Examiner* — Mong-Thuy Tran
(74) *Attorney, Agent, or Firm* — Fujitsu Patent Center

(57) ABSTRACT

In a control apparatus, to control operations with a first base station forming a first radio section and a second base station forming a second radio section which is overlaid with the first radio section and has relatively lower transmission power, a connection change determination unit determines whether to perform connection in response to a connection destination change request from a mobile terminal, a measurement unit measures communication conditions from the first or second base station about all mobile terminals existing in the first radio section, a change value determination unit determines a change value of transmission power of the second base station, a prediction unit predicts communication conditions after transmission power of the second base station is changed based on the change value, and a power change unit changes transmission power of the second base station based on the change value.

9 Claims, 26 Drawing Sheets

(56) References Cited

U.S. PATENT DOCUMENTS

| | | | |
|---|---|---|---|
| 8,126,496 B2* | 2/2012 | Brisebois et al. | 455/522 |
| 8,301,151 B2* | 10/2012 | Back | 455/444 |
| 8,849,263 B2* | 9/2014 | Jung et al. | 455/415 |
| 2003/0119541 A1* | 6/2003 | Ubuki et al. | 455/522 |
| 2005/0130662 A1* | 6/2005 | Murai | 455/444 |
| 2007/0042799 A1 | 2/2007 | Jubin et al. | |
| 2007/0184839 A1* | 8/2007 | Igarashi et al. | 455/436 |
| 2008/0032684 A1* | 2/2008 | Yagyu et al. | 455/420 |
| 2009/0318182 A1* | 12/2009 | Nagato et al. | 455/522 |
| 2010/0120447 A1* | 5/2010 | Anderson et al. | 455/456.1 |
| 2010/0273471 A1* | 10/2010 | Meshkati et al. | 455/422.1 |
| 2011/0003597 A1* | 1/2011 | Budic et al. | 455/450 |
| 2011/0189988 A1 | 8/2011 | Morimoto et al. | |
| 2011/0207468 A1* | 8/2011 | Nakamura et al. | 455/450 |
| 2011/0207500 A1* | 8/2011 | Nakamura et al. | 455/522 |
| 2012/0190374 A1* | 7/2012 | Jo et al. | 455/450 |

FOREIGN PATENT DOCUMENTS

| | | |
|---|---|---|
| JP | 2004-235839 | 8/2004 |
| JP | 2009-171584 | 7/2009 |
| JP | 2009-303221 | 12/2009 |
| JP | 2010-016420 | 1/2010 |
| JP | 2010-045547 | 2/2010 |
| JP | 2010-062951 | 3/2010 |
| WO | WO-2010/018746 | 2/2010 |

OTHER PUBLICATIONS

EESR—Extended European Search Report issued on Jan. 5, 2015 for corresponding European Application No. 10856694.4.
QUALCOMM Europe: "RANAP signaling to enable Enhanced Interference Management for HNBs", 3GPP Draft, R3-091871 RANAP-FOR-HNB-EIM, 3rd Generation Partnership Project (3GPP), Mobile Competence Centre, Aug. 20, 2009, XP050353236.
Motorola, Inc.—Guang Han et al; "A method to support femto-macro handover with minimal interference to the macro network", IP.com Journal, IP.com Inc., West Henrietta, NY, US, Oct. 16, 2008, XP013126575.
Troels Kolding et al: "Home Node B and Femtocells" In: nWCDHA for UHTS, Aug. 6, 2818 (2818-88-86), John Wiley 8 Sons, Ltd, Chichester, UK, XP855893193.

* cited by examiner

FEMTOCELL CHANGE
REQUEST MESSAGE M11

FEMTOCELL CHANGE
RESPONSE MESSAGE M12

TRANSMISSION POWER
CHANGE MESSAGE M31

TRANSMISSION POWER
CHANGE RESPONSE
MESSAGE M32

TERMINAL POSITION
INFORMATION REQUEST
MESSAGE M41

TERMINAL POSITION
INFORMATION RESPONSE
MESSAGE M42

FIG. 24A

| TERMINAL ID | TERMINAL POSITION INFORMATION | AVERAGE USER DATA AMOUNT | eNB SPECIFIC INFORMATION DURING COMMUNICATION | RECEIPT TIME |
|---|---|---|---|---|
| UE1 | | | | |
| UE2 | | | | |
| ⋮ | | | | |
| UEm | | | | |

FIG. 24B

| eNB ID | POSITION INFORMATION | TRANSMISSION POWER | UPPER eNB SPECIFIC INFORMATION |
|---|---|---|---|
| HeNB1 | | | |
| HeNB2 | | | |
| ⋮ | | | |
| HeNBm | | | |

CONTROL APPARATUS, CONTROL METHOD, AND MOBILE COMMUNICATION SYSTEM

CROSS-REFERENCE TO RELATED APPLICATION

This application is a continuation application of International Application PCT/JP2010/064950 filed on Sep. 1, 2010 and designated the U.S., the entire contents of which are incorporated herein by reference.

FIELD

The embodiments discussed herein are related to a control apparatus, a control method, and a mobile communication system.

BACKGROUND

In a mobile communication system, use of a femtocell lower than a so-called macro cell in transmission power is expanded with the object of efficiently using radio resources, eliminating a radio wave dead zone, reducing the cost of developing an area, and improving communication quality. To improve the communication quality, in a mobile communication system in which the above-described macrocell and femtocell are mixed, it is preferred that if possible, a mobile terminal is present in a femtocell and performs communication. In order that more mobile terminals may be present in a femtocell, it is considered, for example, that transmission power of the femtocell is increased and a cell radius is expanded.

In a mobile communication system in which a macrocell and a femtocell use the same frequency band, however, radio waves transmitted from each of the macrocell and femtocell interfere with each other, and as a result communication quality of the other side is deteriorated. Particularly, when transmission power is increased to improve communication quality of the femtocell as described above, interference which exerts an influence on communication of a macrocell and other femtocells located on the periphery of the femtocell may increase.

In a citation list as indicated below, for example, there will be described a technique for solving a technical problem according to deterioration of communication quality due to interference between a macrocell and a femtocell. In the following citation list, a technique will be described such that when transmission power of a femtocell which refuses a handover request from a mobile terminal is decreased and a cell radius is reduced, interference to a mobile terminal which is present in a cell being a handover request source is suppressed.

Japanese Laid-open Patent Publication No. 2010-16420

However, with regard to techniques which are described in the above-described citation list, problems described below are left. When transmission power of a femtocell is decreased in handover operations of one mobile terminal, an influence is exerted on interference to the other mobile terminals connected to the femtocell and an interference amount is increased. As a result, communication speed of mobile terminals is reduced and communication is disabled.

On the other hand, more mobile terminals are also requested to be present in a femtocell. During handover operations, when transmission power of a femtocell is increased and a cell radius is expanded, there is an advantage that a mobile terminal preferably hands over to the femtocell and starts communication.

SUMMARY

In one aspect of the embodiments, there is provided a control apparatus to control operations with a first base station which forms a first radio section and communicates with a mobile terminal, and a second base station which forms a second radio section that is overlaid with the first radio section and is relatively lower than the first radio section in transmission power and communicates with the mobile terminal. The control apparatus includes: a connection change determination unit which determines whether to perform connection in response to a change request of a connection destination from the mobile terminal; a measurement unit which measures communication conditions from the first or second base station about all of mobile terminals which are located in the first radio section; a change value determination unit which determines a change value of transmission power of the second base station; a prediction unit which predicts the communication conditions after the transmission power of the second base station is changed based on the change value; and a power change unit which changes the transmission power of the second base station based on the change value, wherein when the mobile terminal changes a connection destination between the first and second base stations, the power change unit changes the transmission power of the second base station according to a measurement result and prediction result of the communication conditions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 24A and 24B are an example of a table stored in a memory of a control apparatus;

DESCRIPTION OF EMBODIMENTS

Figure 1:
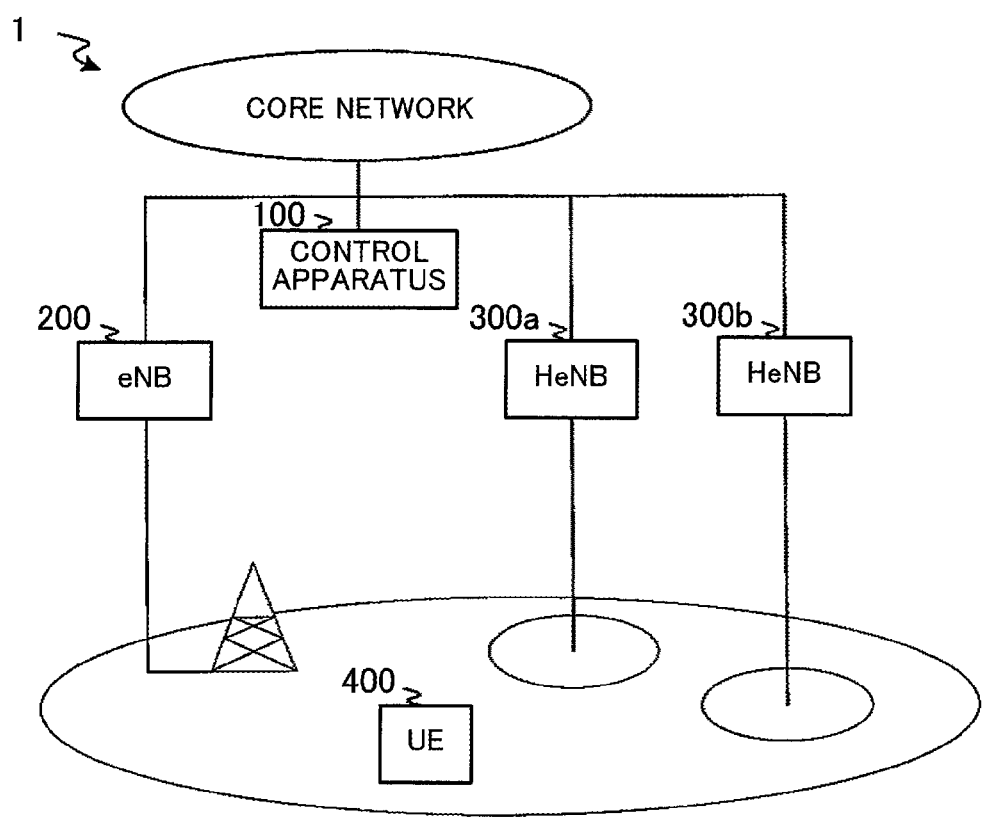
FIG. 1 illustrates the whole configuration of a mobile communication system.

Preferred embodiments of the present invention will now be described in detail below with reference to the accompanying drawings, wherein like reference numerals refer to like elements throughout.

(1) Configuration Example

Referring to FIG. 1, a configuration of a mobile communication system to which one example of a disclosed control apparatus is adapted is illustrated. FIG. 1 is a block diagram illustrating the whole configuration of the mobile communication system 1. Examples of the mobile communication system 1 include a radio communication system adopting an LTE (Long Term Evolution) system.

As illustrated in FIG. 1, the mobile communication system 1 includes the control apparatus 100, an eNB (evolved Node B) 200 being a radio base station which forms a macrocell, and a plurality of base stations HeNBs (Home eNB) 300a and HeNBs 300b which form a femtocell arranged so as to be overlaid with the macrocell. By using the same frequency, the eNB 200, HeNB 300a, and HeNB 300b each perform radio communication with UEs 400 which are present in a subordinate macrocell or femtocell. When providing an explanation without distinguishing the HeNB 300a from the HeNB 300b, descriptions will be made by using an HeNB 300. In an embodiment, descriptions will be made with regard to the eNB 200 being a macrocell base station as an example of a first base station and the HeNB 300 being a femtocell base station as an example of a second base station; further, other base stations may be used. As an example of the second base station, for example, a microcell lower than a macrocell in transmission power may be used.

The control apparatus 100 is one example of the disclosed control apparatus, and is connected to each of the base stations eNB 200, HeNB 300a, and HeNB 300b of the mobile communication system 1 so as to communicate with them.

Fundamental configurations and functions of the control apparatus 100 will be described with reference to FIGS. 2 and 3.

Figure 2:
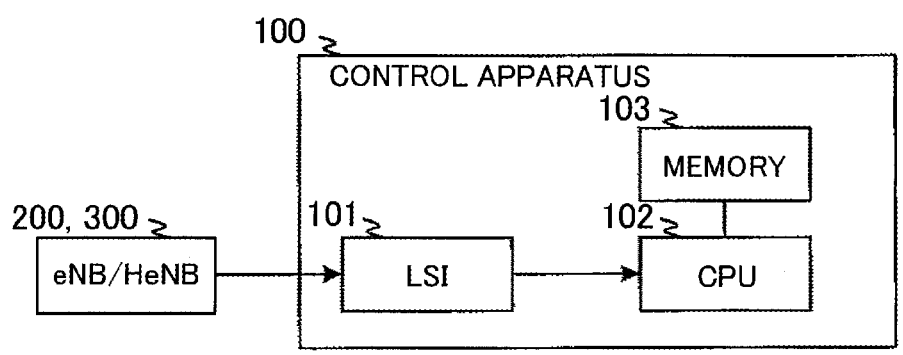
FIG. 2 is a block diagram illustrating an example of a hardware configuration of a control apparatus.

FIG. 2 is a block diagram illustrating one example of a hardware configuration of the control apparatus 100. The control apparatus 100 includes an LSI (Large Scale Integration) 101, a CPU 102, and a memory 103. The LSI 101 is configured to be connected to the eNB 200 and HeNB 300, and perform information communication. In addition, at least a part of the LSI 101 may include an FPGA (Field Programmable Gate Array). The CPU 102 controls operations of each unit of the control apparatus 100 and executes programs, for example, stored in the memory 103. The process permits the CPU 102 to perform the same operations as those of each function unit illustrated in FIG. 3.

Figure 3:
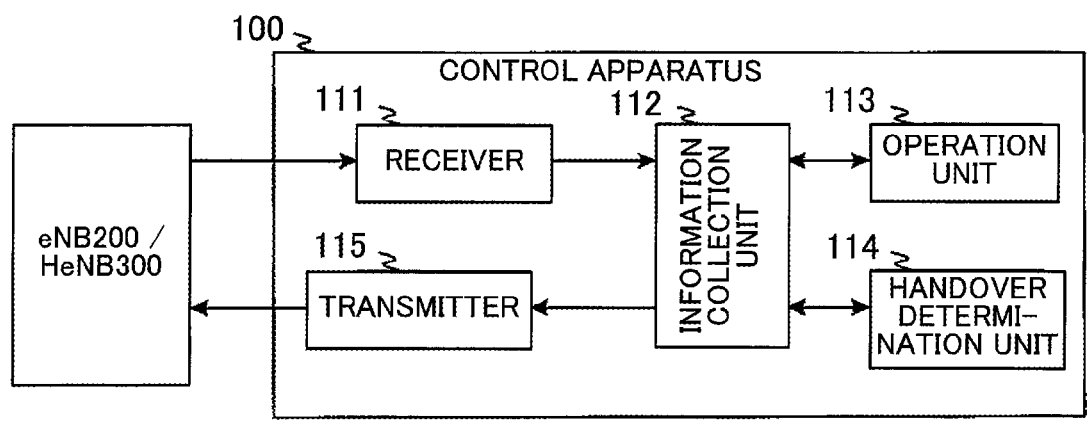
FIG. 3 is a block diagram illustrating functional units of a control apparatus.

FIG. 3 is a block diagram illustrating a configuration of functional units in the CPU 102 of the control apparatus 100. As illustrated in FIG. 3, the CPU 102 of the control apparatus 100 includes functional units of a receiver 111, an information collection unit 112, an operation unit 113, a handover determination unit 114, and a transmitter 115.

The receiver 111 is an interface unit which transfers to the information collection unit 112 a signal received from the connected eNB 200 or HeNB 300.

The information collection unit 112 analyzes signals received from the receiver 111 so as to perform operations requested by a message included in the signals and obtain information included in the signals. The information collection unit 112 is one example of a measurement unit and a prediction unit of the control apparatus 100. The information collection unit 112 further collects a user data amount to be transmitted, information about interference, and position information with regard to the UE 400 to be transmitted from the eNB 200 and HeNB 300.

Based on the signals produced from the information collection unit 112, the operation unit 113 performs arithmetic processing at the time of performing handover processing about the UE 400. The operation unit 113 is one example of a change value determination unit of the control apparatus 100, and determines a change value of transmission power of the HeNB 300 in femtocell control processing as described later. Further, the operation unit 113 is one example of a power changing unit of the control apparatus 100, and creates a message for instructing the HeNB 300 to change transmission power based on the determined change value of the transmission power.

The handover determination unit 114 is one example of a connection change determination unit of the control apparatus 100. Based on the operation results performed by the operation unit 112, the handover determination unit 114 determines whether to perform handover processing about the UE 400.

The transmitter 115 is an interface unit which transmits information to the connected eNB 200 and HeNB 300.

The eNB 200 is one example of the disclosed first base station and is, for example, a so-called macrocell base station. The HeNB 300 is one example of the disclosed second base station and is, for example, a so-called femtocell base station smaller than a macrocell base station in the transmission power. Fundamental configurations and functions of the eNB 200 will be described with reference to FIGS. 4 and 5.

Figure 4:
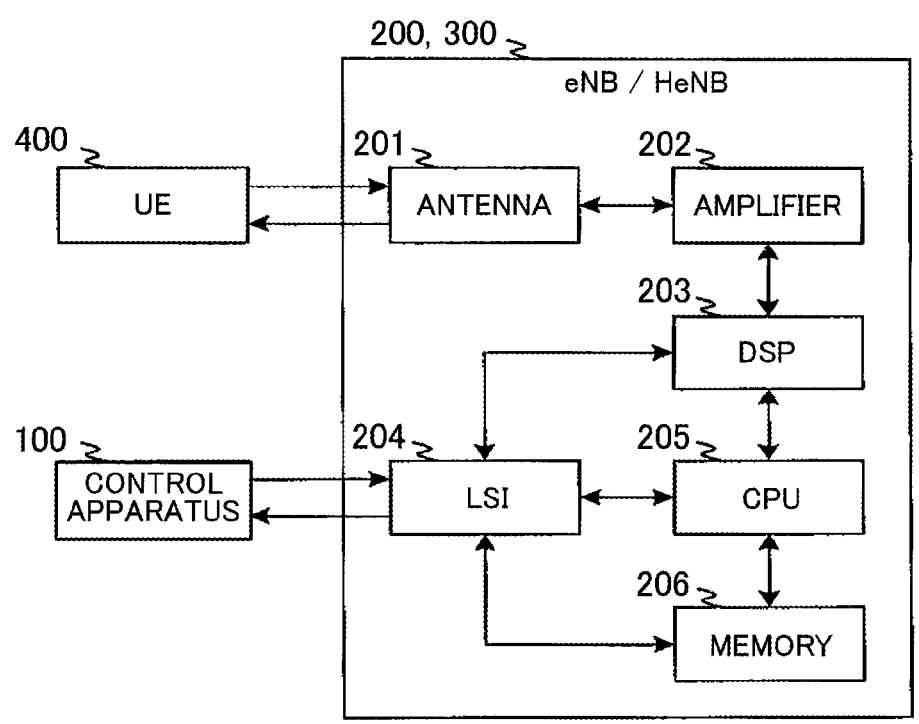
FIG. 4 is a block diagram illustrating an example of a hardware configuration of a base station.

FIG. 4 is a block diagram illustrating one example of a hardware configuration of the eNB 200. The eNB 200 includes an antenna 201, an amplifier 202, a DSP (Digital Signal Processor) 203, an LSI 204, a CPU 205, and a memory 206. The antenna 201 is an antenna which transmits transmission radio waves and forms a cell to communicate with the UE 400 present in the cell. The amplifier 202 is configured to amplify signals transmitted and received by the antenna 201. The DSP 203 performs a process of converting information to be received via a network to a mode to be produced from the antenna 201 and a process of converting information to be supplied to the antenna 201 to a mode to be transmitted to the network. The LSI 204 is configured to be connected to the control apparatus 100 and communicate information. At least a part of the LSI 204 may include an FPGA (Field Programmable Gate Array). The CPU 205 is configured to control operations of each unit of the eNB 200 and, at the same time, execute programs, for example, stored in the memory 206 to perform the same operations as those of each functional unit illustrated in FIG. 5. The HeNB 300 also has the same configurations as those of the above description. Much the same is true on the following functional units.

Figure 5:
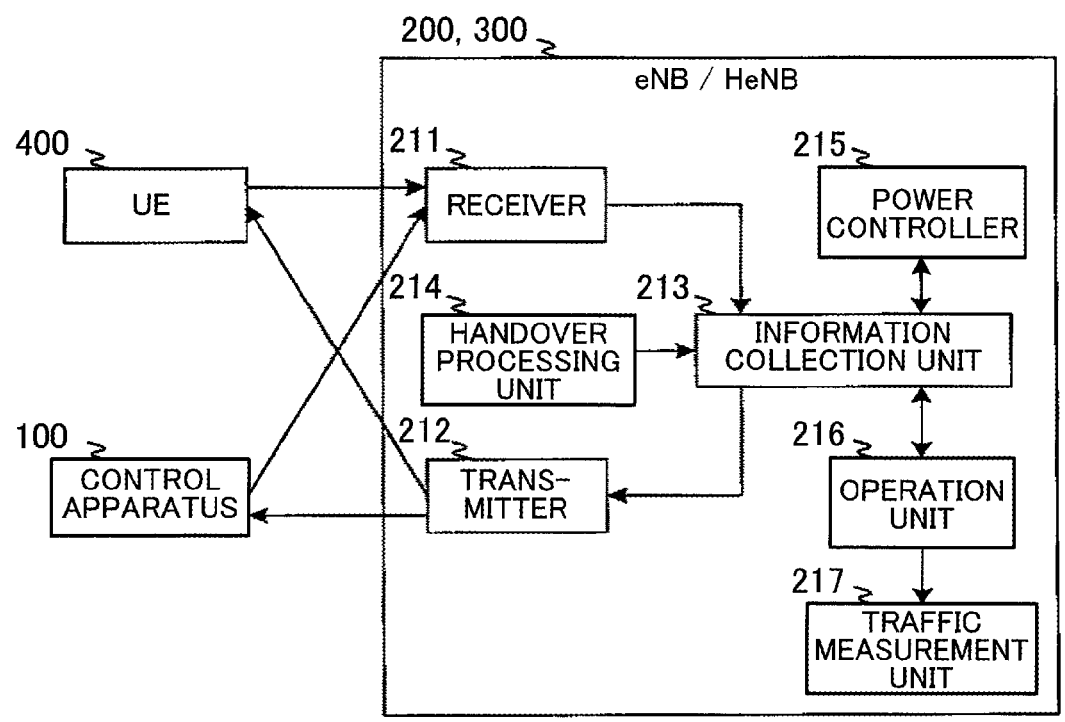
FIG. 5 is a block diagram illustrating functional units in a base station.

FIG. 5 is a block diagram illustrating configurations of functional units in the CPU 205 of the eNB 200. As illustrated in FIG. 5, the CPU 205 of the eNB 200 includes functional units of a receiver 211, a transmitter 212, an information collection unit 213, a handover processing unit 214, a power controller 215, an operation unit 216, and a traffic measurement unit 217.

The receiver 211 is an interface unit which transfers to the information collection unit 213 a signal received from the control apparatus 100 and UE 400. The transmitter 212 is an interface unit which transmits information to the control apparatus 100 and UE 400.

The information collection unit 213 analyzes signals received from the receiver 211 so as to perform operations requested by a message included in the signals and collect information included in the signals.

When a message in which a handover from the UE 400 is requested is received by the information collection unit 213, the handover processing unit 214 performs handover processing according to the request. For performing the handover processing, the handover processing unit 214 further determines whether to perform the after-mentioned femtocell control processing, and notifies the information collection unit 213 of the determination results.

When a change in the transmission power is requested in the after-mentioned femtocell control processing, the power controller 215 changes transmission power of transmission radio waves to be transmitted via the antenna 201. As described later, the power controller 215 mainly performs change control of the transmission power in the HeNB 300 being a femtocell base station.

With regard to the UE 400 which is connected to the eNB 200 or HeNB 300, the operation unit 216 requests the traffic measurement unit 217 to measure an average user data amount to be transmitted. With regard to each UE 400 which is connected to the eNB 200 or HeNB 300, the traffic measurement unit 217 appropriately measures a user data amount to be transmitted, and stores it in the memory 206. Further, when requested to measure an average user data amount by the operation unit 216, the traffic measurement unit 217 further calculates the average user data amount about each UE 400 based on the stored user data amount for transmission.

The UE 400 is one example of the disclosed mobile terminal. When present in a cell formed by the eNB 200 or HeNB 300, the UE 400 communicates with a core network via the eNB 200 or HeNB 300. Fundamental configurations and functions of the UE 400 will be described with reference to FIGS. 6 and 7.

Figure 6:
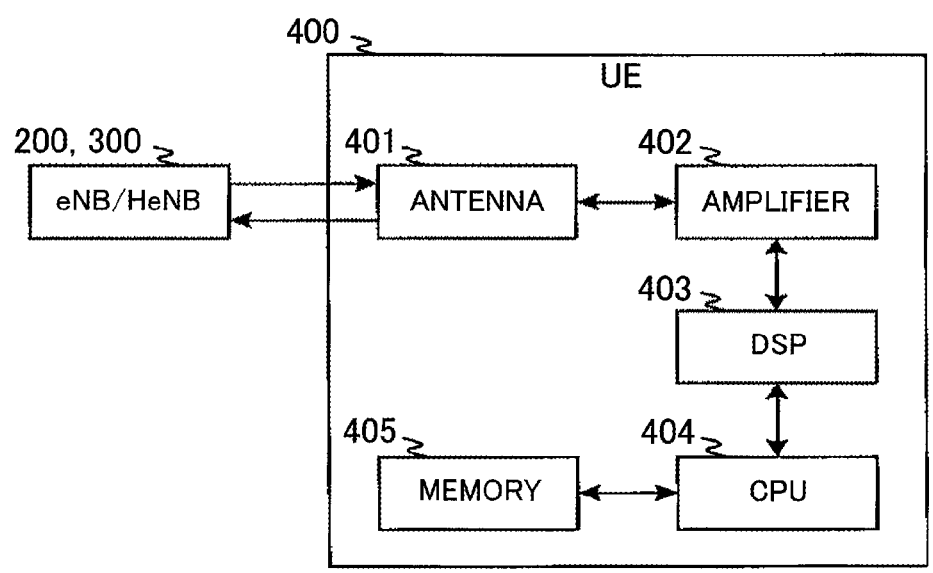
FIG. 6 is a block diagram illustrating an example of a hardware configuration of a mobile terminal.

FIG. 6 is a block diagram illustrating one example of a hardware configuration of the UE 400. The UE 400 includes an antenna 401, an amplifier 402, a DSP 403, a CPU 404, and a memory 405. The antenna 401 is an antenna which receives transmission radio waves from the eNB 200 or HeNB 300 and communicates with the eNB 200 or HeNB 300. The amplifier 402 is configured to amplify signals transmitted and received by the antenna 401. The DSP 403 is configured to perform a process of converting signals transmitted and received by the antenna 401 and information used by the UE 400. The CPU 404 is configured to control operations of each unit of the UE 400 and at the same time execute programs, for example, stored in the memory 405 so as to perform the same operations as those of each functional unit illustrated in FIG. 7.

Figure 7:
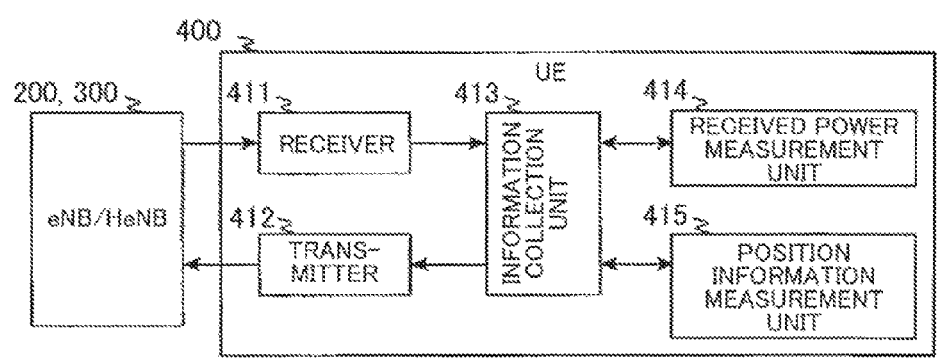
FIG. 7 is a block diagram illustrating functional units of a mobile terminal.

FIG. 7 is a block diagram illustrating configurations of functional units in the CPU 404 of the UE 400. As illustrated in FIG. 7, the CPU 404 of the UE 400 has functional units of a receiver 411, a transmitter 412, an information collection unit 413, a received power measurement unit 414, and a position information measurement unit 415.

The receiver 411 is an interface unit which transfers to the information collection unit 413 a signal received from the eNB 200 or HeNB 300. The transmitter 412 is an interface unit which transmits information to the eNB 200 or HeNB 300.

The information collection unit 413 analyzes signals received from the receiver 411 so as to perform operations requested by a message included in the signals and collect information included in the signals.

The received power measurement unit 414 regularly measures received power from the connected eNB 200 or HeNB 300 or the unconnected peripheral eNB 200 or HeNB 300. When a request of measurement results of the received power is received from the connected eNB 200 or HeNB 300, the received power measurement unit 414 transmits the measurement results thereto.

The position information measurement unit 415 obtains position information of the UE 400 by using a GPS. At this time, the position information measurement unit 415 obtains position information of the UE 400 and measures a GPS measurement error indicating accuracy of the position information. When a request of terminal position information is received from the connected eNB 200 or HeNB 300, the position information measurement unit 415 transmits the position information and GPS measurement error information thereto.

(2) Operation Example

Figure 8:
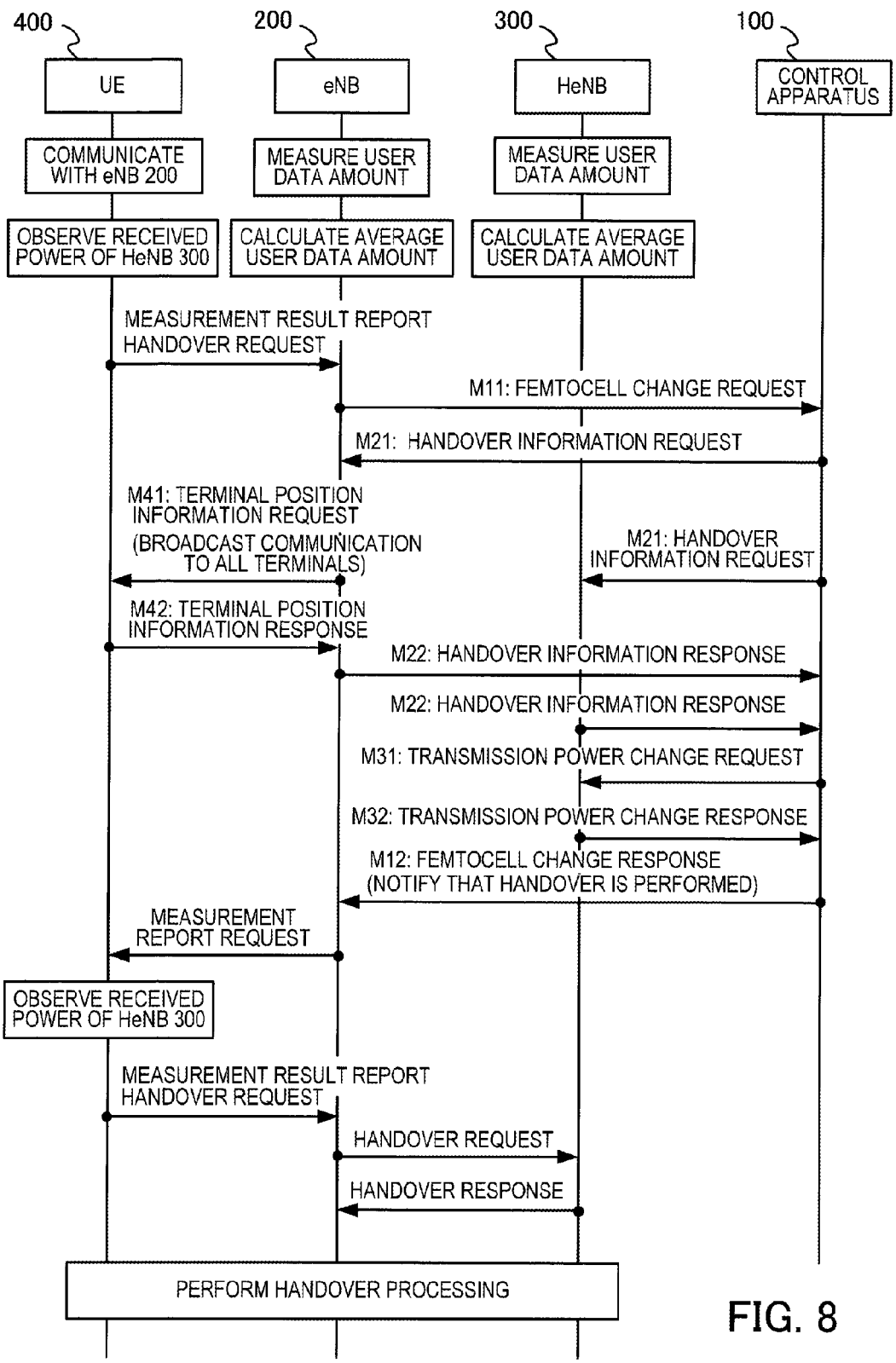
FIG. 8 is a sequence diagram illustrating operations of each unit according to handover processing.

Operations of the control apparatus 100 will be described with reference to FIG. 8. FIG. 8 is a sequence diagram illustrating a process flow through the control apparatus 100 according to handover processing about the UE 400. In an example illustrated in FIG. 8, there is illustrated a process in which the UE 400 contained in the eNB 200 hands over to the HeNB 300 which forms a femtocell so as to be overlaid with a cell area of the eNB 200.

The UE 400 communicating with the eNB 200 appropriately measures received power from the HeNB 300. When the received power from the HeNB 300 is larger than a predetermined threshold, the UE transmits to the eNB 200 a measurement result of the received power and a message for requesting a handover to the HeNB 300.

The eNB 200 which receives the handover request message transmits to the control apparatus 100 a femtocell change request message M11 including information for specifying the HeNB 300 being a handover destination. The femtocell change request message M11 is a message for requesting femtocell control processing to change transmission power and a cell radius of the HeNB 300 being a handover destination to the control apparatus 100 from the eNB 200 being a handover source.

Figure 9A:
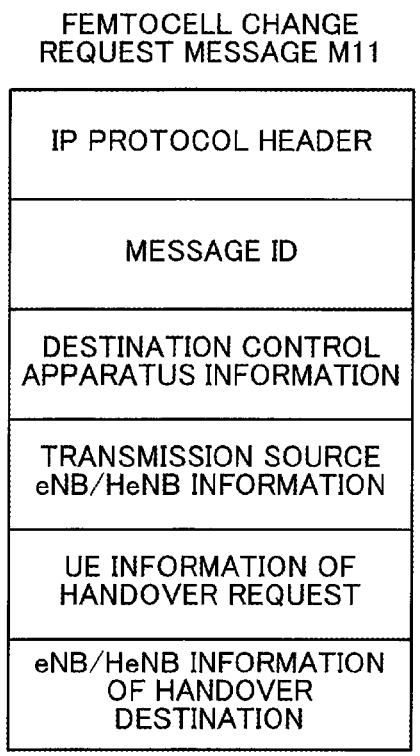
FIGS. 9A and 9B illustrate a configuration example of a message.

With regard to information included in the femtocell change request message M11, an example is illustrated in FIG. 9A. The femtocell change request message M11 includes information for specifying each of the control apparatus 100 being a transmission destination, the eNB 200 or HeNB 300 being a transmission source, the UE 400 requesting a handover, and the HeNB 300 or eNB 200 being a handover destination.

Referring again to FIG. 8, to the eNB 200 and a plurality of the HeNBs 300 including the HeNB 300 being a handover destination, the control apparatus 100 which receives the femtocell change request message M11 transmits a handover information request message M21 for requesting each information of current transmission power as well as a position and an average user data amount of each of the connected UEs 400. When a transmission source of the femtocell change request message M11 is the eNB 200, the control apparatus 100 transmits the handover information request message M21 to the eNB 200 and the HeNBs 300 of all the femtocells which are overlaid with an area of a cell of the eNB 200. At this time, the control apparatus 100 refers to arrangement position information of the eNB 200 and HeNB 300 stored in the memory 103, and determines a transmission destination of the handover information request message M21.

Figure 10A:
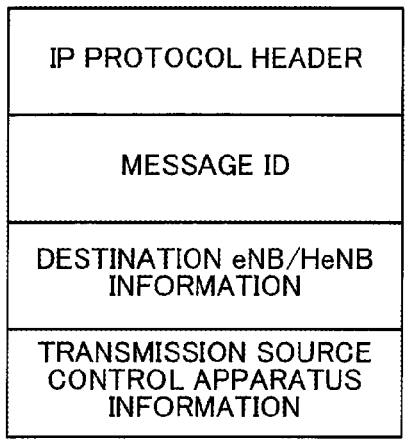
FIGS. 10A and 10B illustrate a configuration example of a message.

With regard to information included in the handover information request message M21, an example is illustrated in FIG. 10A. The handover information request message M21 includes information for specifying each of the eNB 200 or HeNB 300 being a transmission destination and the control apparatus 100 being a transmission source.

Referring again to FIG. 8, after the handover information request message M21 is received, the eNB 200 and HeNB 300 transmit to the connected UEs 400 a terminal position information request message M41 for requesting position information of each UE 400. At this time, by using so-called broadcast communication, the eNB 200 and HeNB 300 may preferably transmit the above-described message to all of the connected UEs 400. After the terminal position information request message M41 is transmitted, the eNB 200 and HeNB 300 wait for reception of response from the connected UE 400 for a predetermined period.

The UE 400 which receives the terminal position information request message M41 from the connected eNB 200 performs position information measurement processing. Specifically, in the position information measurement unit, the UE 400 measures position information and a GPS measurement error by using a GPS. The UE 400 then transmits a terminal position information response message M42 including the position information and GPS error information of the UE 400 to the eNB 200 being a transmission source of the terminal position information request message M41.

Figure 12A:
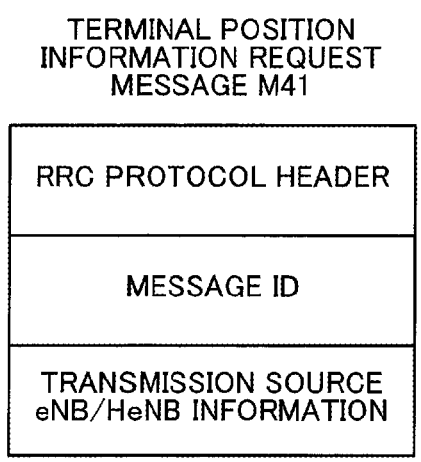
FIGS. 12A and 12B illustrate a configuration example of a message.
Figure 12B:
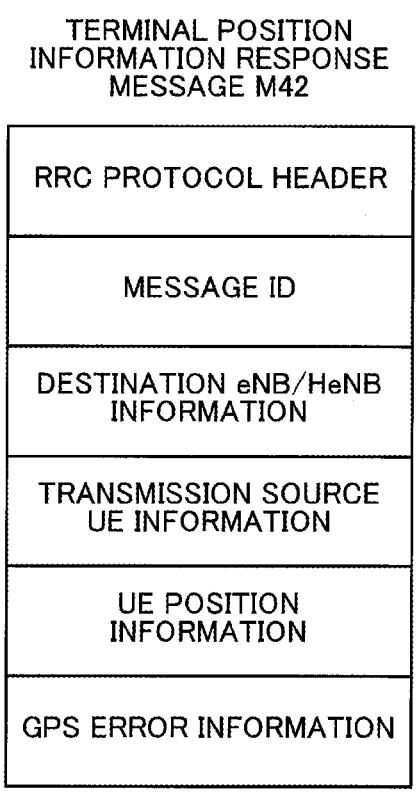

With regard to information included in the terminal position information request message M41 and terminal position information response message M42, an example is illustrated in FIG. 12. The terminal position information request message M41 includes information for specifying the eNB 200 or HeNB 300 being a transmission source, and is a message for notifying the UE 400 of an instruction for requesting the terminal position information. The terminal position information response message M42 includes information for specifying each of the eNB 200 or HeNB 300 being a transmission destination and the UE 400 being a transmission source, and the terminal position information and GPS measurement error information of the UE 400 being a transmission source.

The eNB 200 and HeNB 300 regularly measures a user data amount to each of the connected UEs 400 received via the core network and stores it in the memory. Based on the user data amount stored in the memory, the eNB 200 and HeNB 300 calculate the average user data amount for each predetermined period.

An operation flow of the eNB 200 and HeNB 300 after transmitting the terminal position information request message M41 will be described with reference to a flowchart of FIG. 13. After a predetermined period from the transmission of the terminal position information request message M41, the eNB 200 and HeNB 300 collect position information of each UE 400 from the received terminal position information response message M42 (Step S101). The eNB 200 and HeNB 300 further add to the collected position information the average user data amount and transmission power of the eNB 200 or HeNB 300 for the period so as to generate a handover information response message M22, thereby transmitting the message to the control apparatus 100 (Step S104).

Figure 10B:
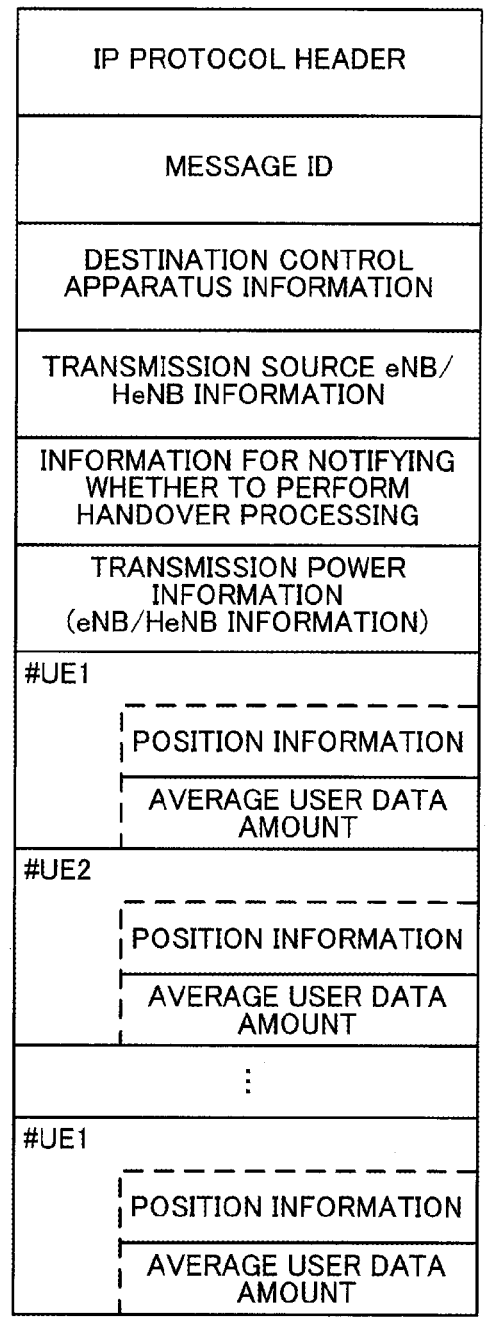

With regard to information included in the handover information response message M22, an example is illustrated in FIG. 10B. The handover information response message M22 includes information for specifying the control apparatus 100 being a transmission destination and the eNB 200 or HeNB 300 being a transmission source, and at the same time, identification numbers #UE 1, 2, . . . , and n, position information, and average user data amount of each of the connected UEs 400. The handover information response message M22 further includes information for notifying the control apparatus 100 whether to perform handover processing about the UE 400 determined through the following operations.

Based on the GPS measurement error included in the terminal position information response message M42 received from the UE 400, the eNB 200 and HeNB 300 determine whether to perform handover processing. When the GPS measurement error indicating measurement accuracy of the position information of the UE 400 is large, calculation accuracy of the received power depending on a distance from the eNB 200 or HeNB 300 to the UE 400 may be reduced as described in detail below. To solve the above-described problem, the eNB 200 and HeNB 300 may determine a predetermined threshold about the GPS measurement error included in the terminal position information response message M42 received from the UE 400. When the GPS measurement error larger than the threshold is detected, the eNB 200 and HeNB 300 may notify the control apparatus 100 of its effect and terminate subsequent processes.

Figure 13:
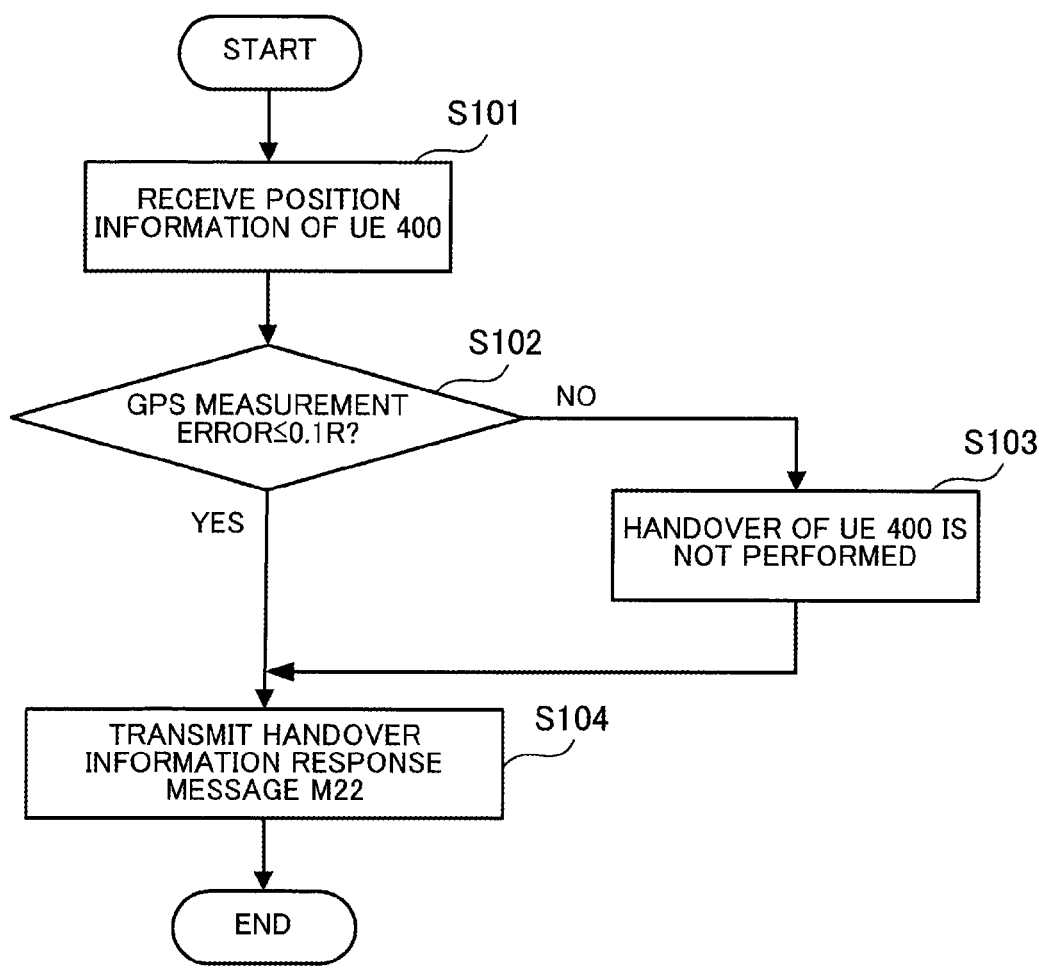
FIG. 13 is a flowchart illustrating a process in a base station.

In an example illustrated in FIG. 13, the eNB 200 and HeNB 300 set 10% (0.1R) of a cell radius R as a threshold of the GPS measurement error in which the handover processing is performed.

The GPS measurement error included in the terminal position information response message M42 received from the UE 400 is supposed to be smaller than or equal to 0.1R (Yes at step S102). In this case, the eNB 200 and HeNB 300 transmit to the control apparatus 100 the handover information response message M22 including information for notifying the control apparatus 100 that the handover processing about the UE 400 is performed.

On the other hand, when the GPS measurement error of the UE 400 is supposed to be larger than 0.1 R (No at step S102), the eNB 200 and HeNB 300 determine that the handover processing about the UE 400 is not performed (Step S103). In this case, the eNB 200 and HeNB 300 transmit to the control apparatus 100 the handover information response message M22 including information for notifying the control apparatus 100 that the handover processing is not performed.

The control apparatus 100 analyzes the handover information response message M22 and updates database in a memory in the case of performing the handover processing, thus performing the handover processing. In the case where the handover processing is not performed, the control apparatus 100 does not update the database in the memory. Through the above-described setting, the control apparatus 100 suppresses the handover processing on which an influence is exerted by the measurement error about the position information of the UE 400.

Referring again to FIG. 8, based on the handover information response message M22 received from the eNB 200 and HeNB 300, the control apparatus 100 performs arithmetic processing according to the handover processing about the UE 400 through the operation unit 113. The control apparatus 100 further determines, through the handover determination unit 114, whether the handover processing about the UE 400 is performed.

Based on the above-described arithmetic processing and determination results, when determining that a change in the transmission power is needed in the HeNB 300 being a handover destination, the control apparatus 100 transmits a transmission power change request message M31 to the HeNB 300.

Figure 11A:
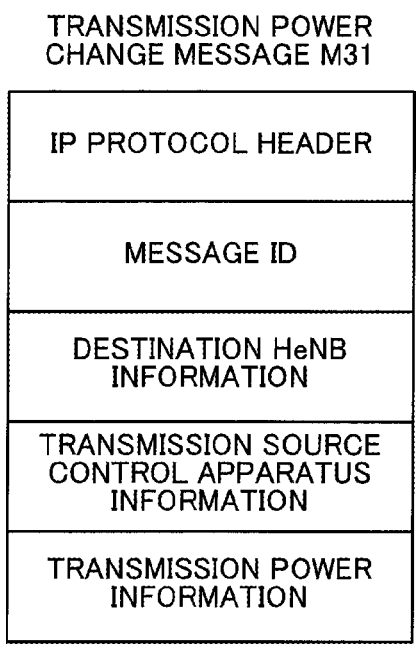
FIGS. 11A and 11B illustrate a configuration example of a message.

With regard to information included in the transmission power change request message M31, an example is illustrated in FIG. 11A. The transmission power change request message M31 includes information for specifying each of the HeNB 300 being a transmission destination and the control apparatus 100 being a transmission source, and information for specifying a change in the transmission power to the HeNB 300.

Referring again to FIG. 8, through the power controller, the HeNB 300 which receives the transmission power change request message M31 changes transmission power of the HeNB 300 based on the electric energy included in the message. After the change, the HeNB 300 transmits to the control apparatus 100 a transmission power change response message M32 for notifying the control apparatus 100 that the transmission power is changed.

Figure 11B:

With regard to information included in the transmission power change response message M32, an example is illustrated in FIG. 11B. The transmission power change response message M32 includes information for specifying each of the control apparatus 100 being a transmission destination and the HeNB 300 being a transmission source, and information for notifying the control apparatus 100 that a change in the transmission power of the HeNB 300 is completed.

Referring again to FIG. 8, after reception of the transmission power change response message M32, the control apparatus 100 transmits to the eNB 200 being a handover source a femtocell change response message M12 for notifying the eNB 200 that handover processing about the UE 400 is performed.

Figure 9B:
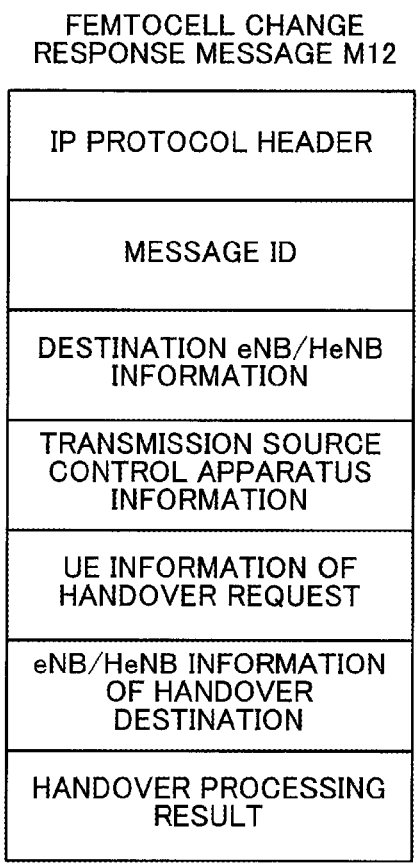

With regard to information included in the femtocell change response message M12, an example is illustrated in FIG. 9B. The femtocell change response message M12 includes information for specifying each of the eNB 200 or HeNB 300 being a transmission destination, the control apparatus 100 being a transmission source, the UE 400 requesting handover, and HeNB 300 or eNB 200 being a handover destination, and further information for notifying the eNB 200 of handover processing results.

In the foregoing description, there is described a process where the UE 400 present in a cell of the eNB 200 hands over to the HeNB 300 which forms a femtocell so as to be overlaid with the cell area of the eNB 200. Further, much the same is true on the handover processing sequence at the time when the UE 400 present in a femtocell of the HeNB 300 hands over to the eNB 200.

Note that, when the UE 400 present in a femtocell of the HeNB 300 hands over to another HeNB 300, the mobile communication system 1 performs a conventional, in other words, known handover processing.

(3) Femtocell Control Processing Example

An example of the above-described femtocell control processing will be described.

Figure 14:
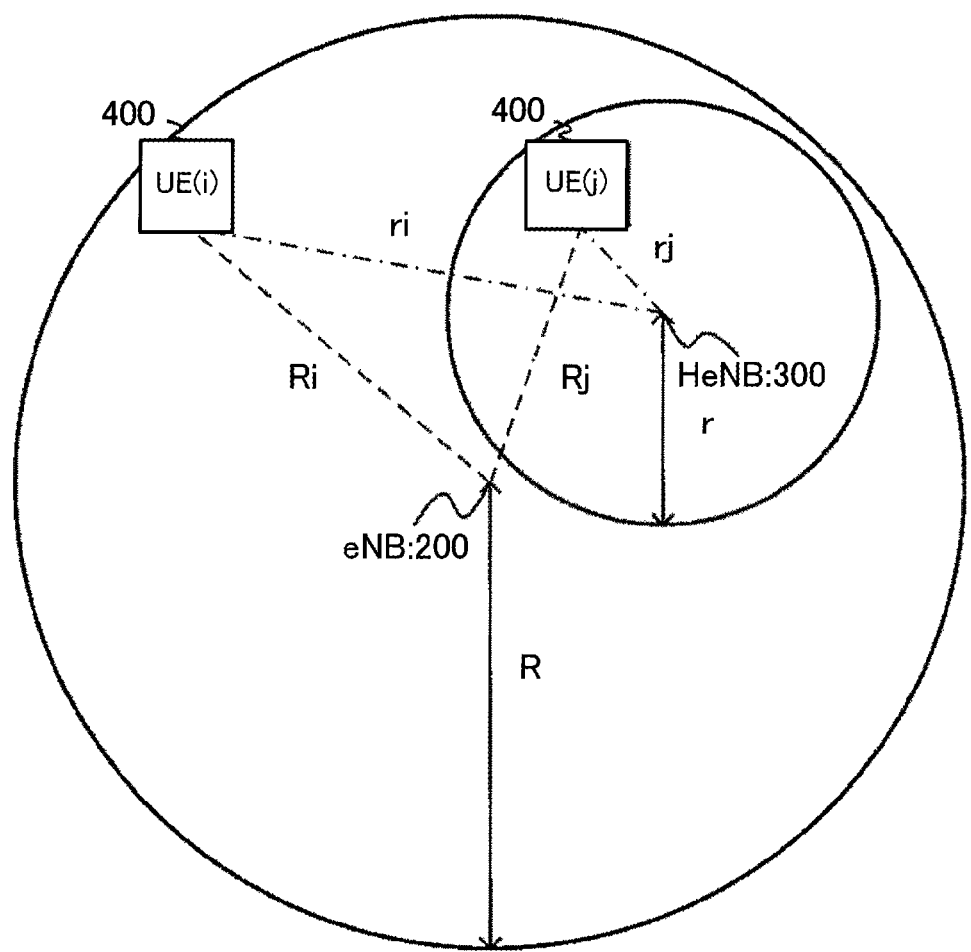
FIG. 14 illustrates a positional relationship between a base station and a mobile terminal.

In the femtocell control processing, a process of controlling transmission power of the HeNB 300 performed in the operation unit 113 of the control apparatus 100 will be described with reference to FIG. 14. In FIG. 14, a cell area of each of the eNB 200 and the HeNB 300 according to the handover of the UE 400 is viewed from above.

In FIG. 14, among UEs present in a cell of the eNB 200, one UE according to handover processing is described as a UE (i) and further, among UEs present in a cell of the HeNB 300, another UE according to handover processing is described as a UE (j) to be distinguished from the other UEs. In FIG. 14, a radius of the cell of the eNB 200 is represented as R, a distance from the eNB 200 to the UE (i) is represented as Ri, and a distance from the eNB 200 to the UE (j) is represented as Rj. In FIG. 14, a radius of the cell of the HeNB 300 is represented as r, a distance from the HeNB 300 to the UE (i) is represented as ri, and a distance from the HeNB 300 to the UE (j) is represented as rj.

In an example of FIG. 14, received power p(Ri, R) of the UE(i) from the eNB 200 is represented as the following formula (1) by a predetermined coefficient S.

$$p(R_i, R) = S\left(\frac{R}{R_i}\right)^2 \quad (1)$$

The cell radius R of the eNB 200 is calculated based on transmission power of the eNB 200, and the Ri from the eNB 200 to the UE(i) is calculated based on position information of the UE(i) detected through a GPS. By using the foregoing formula (1), received power of each of the UEs(i) and (j) from the eNB 200 and HeNB 300 is calculated as a function of the distance.

The UE(i) receives radio waves of the received power p(Ri, R) from the eNB 200 and communicates with the eNB 200. On the other hand, the UE(i) receives interference due to radio waves of the power P(ri, r) from the HeNB 300. A signal-to-interference ratio Q(Ri, R, ri, r) on this occasion is represented as a function of the above-described received power p by the following formula (2).

$$Q(R_i, R, r_i, r) = \frac{p(R_i, R)}{p(r_i, r)} \quad (2)$$

The signal-to-interference ratio Q exerts an influence on the transmission speed of the user data amount to be transmitted to the UE(i) as an object. With relation to all of the UEs which are located in the cell area of the eNB 200 including the cell area of the HeNB 300, the signal-to-interference ratio Q is calculated by using the formula (2).

By using the signal-to-interference ratio Q indicated in the formula (2), the average user data amount E(r) to be transmitted to all of the UEs which are located in the cell area of the eNB 200 with a radius R including the cell area of the HeNB 300 is represented by the following formula (3).

$$E(r) = \sum_{i=1}^{L} D_i \frac{p(R_i, R)}{p(r_i, r)} + \sum_{j=1}^{M} D_j \frac{p(R_j, R)}{p(r_j, r)} \quad (3)$$

In the formula (3), L represents the number of the UEs 400 connected to the eNB 200, and M represents the number of the UEs 400 connected to the HeNB 300, respectively. Di represents the average user data amount to the UE (i), and Dj represents the average user data amount to the UE (j), respectively. An increase in the E(r) represents that the average user data amount to be transmitted in the cell area of the eNB 200 increases, and that communication efficiency is improved in the mobile communication system 1. On the other hand, a decrease in the E(r) represents that the average user data amount to be transmitted the cell area of the eNB 200 decreases due to an influence of interference through transmission radio waves from the HeNB 300, and that communication efficiency is deteriorated in the mobile communication system 1.

As can be seen from the above description, in the femtocell control processing, the transmission power of the HeNB 300 is changed by using as a target value a predetermined power value. Based on the change of the transmission power, a cell radius r of the HeNB 300 is changed. Hereinafter, a cell radius of the HeNB 300 after the change is described as r'. When the cell radius of the HeNB 300 is changed from r to r', the number of the UEs 400 which are located in the cell area of the HeNB 300 is changed. Specifically, when the cell radius increases, the number of the UEs 400 which are located in the cell area of the HeNB 300 increases, whereas when the cell radius decreases, the number of the UEs 400 which are located in the cell area of the HeNB 300 decreases.

As to a change in a radius of the cell area of the HeNB 300 through the femtocell control processing, the increasing number of the UEs 400 connected to the HeNB 300 is set to m in the cell area of the HeNB 300 after the change. In this case, in the cell area of the eNB 200 which is arranged so as to be overlaid with the cell area of the HeNB 300, the UEs 400 connected to the eNB 200 are considered to decrease by m pieces due to a change in the cell area. At this time, the average user data amount E(r') to be transmitted to the connected UE 400 from the HeNB 300 after the change in the cell area is represented by the following formula (4).

$$E(r') = \sum_{i=1}^{L-m} D_i \frac{p(R_i, R)}{p(r_i, r')} + \sum_{j=1}^{M+m} D_j \frac{p(R_j, R)}{p(r_j, r')} \quad (4)$$

The operation unit 113 of the control apparatus 100 predicts the average user data amount after the femtocell control processing and determines implementation contents of the femtocell control processing to the HeNB 300 based on the prediction value. Specifically, when E(r') after the femtocell control processing is larger than or equal to E(r) before the processing (namely, in the case of E(r')≥E(r)), the operation unit 113 performs the femtocell control processing of increasing transmission power of the HeNB 300. On the other hand, when E(r') after the femtocell control processing is smaller than E(r) before the processing (namely, in the case of E(r')<E(r)), the operation unit 113 performs the femtocell control processing of decreasing transmission power of the HeNB 300. The control apparatus 100 further instructs the operation unit 113 to allocate radio resources to each UE 400 according to the user data amount to be transmitted.

(3-1) Process Example According to UE 400 Connected to eNB 200

Figure 15:
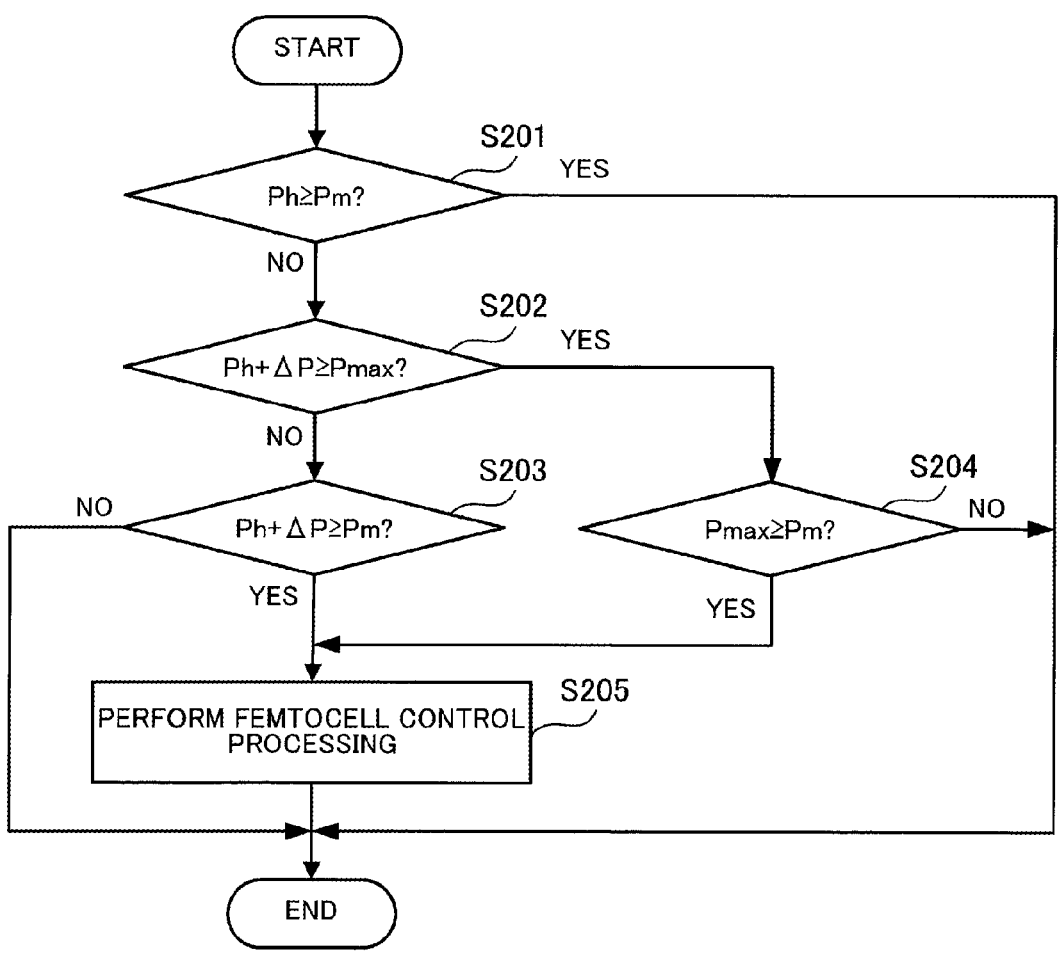
FIG. 15 is a flowchart illustrating a flow of operations of a control apparatus 100 according to handover processing.
Figure 16:
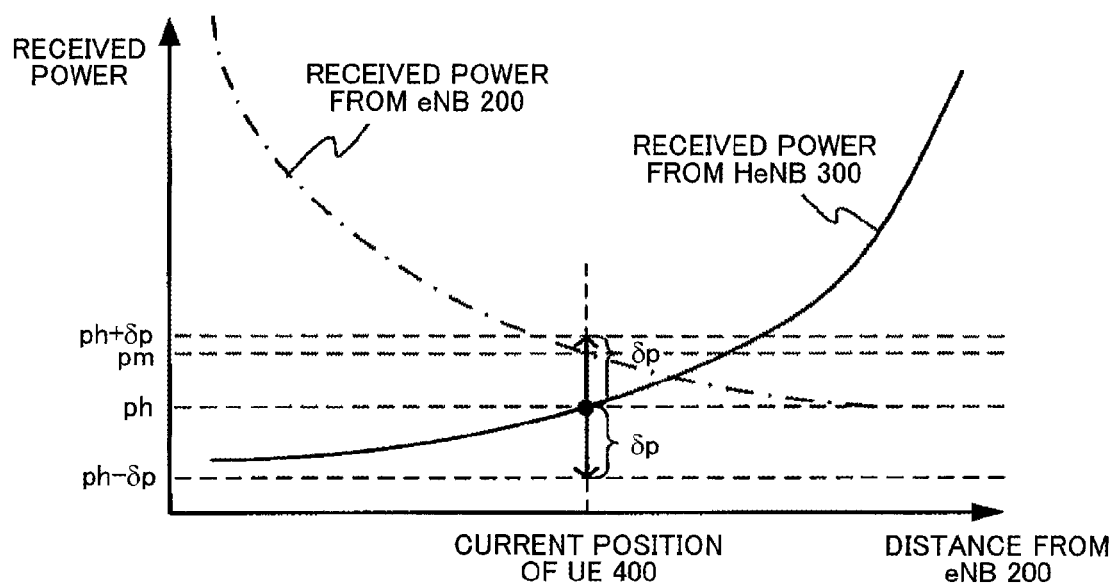
FIG. 16 is a graph illustrating received power from a base station observed in a mobile terminal.
Figure 17:
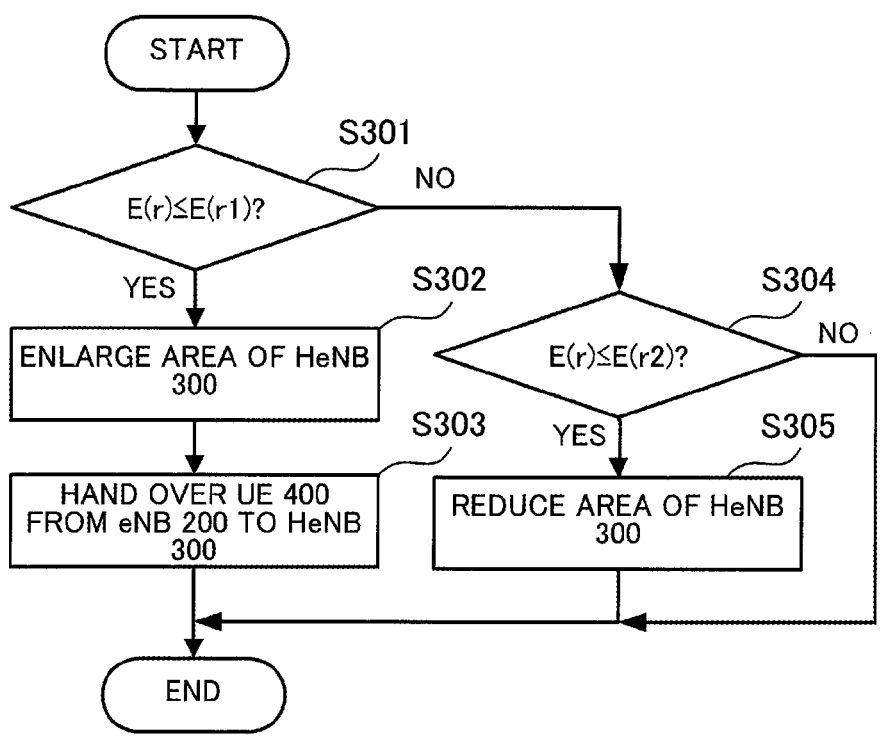
FIG. 17 is a flowchart illustrating a flow of operations of a control apparatus 100 according to femtocell control processing.

Referring to FIGS. 15 to 17, there will be described a process at the start of the femtocell control processing at the time when the UE 400 present in a cell of the eNB 200 hands over to the HeNB 300. FIG. 15 is a flowchart illustrating a flow of determination process of starting the femtocell control processing through the handover processing unit 214 of the eNB 200 being a handover source. The handover processing unit 214 of the eNB 200 which receives the handover request message from the UE 400 present in a cell determines, based on a mode to be described below, whether to perform the femtocell control processing. For an information exchange, for example, the eNB 200 and HeNB 300 regularly report to each other values of the transmission power Pm of the eNB 200 and the maximum transmission power Pmax and minimum transmission power Pmin of the HeNB 300 used in calculations to be described below, or the cell radius R of the eNB 200 and cell radius r of the HeNB 300 used in the above-described calculations of each value.

The handover processing unit 214 compares transmission power Pm of the eNB 200 and transmission power Ph of the HeNB 300 being a handover destination (Step S201). Based on the determination, the handover processing unit 214 determines whether to proceed to the femtocell control processing.

When the transmission power Ph of the HeNB 300 is larger than or equal to the transmission power Pm of the eNB 200 (Yes at step S201), the handover processing unit 214 determines that the femtocell control processing is not needed in the UE 400, and ends the process.

When the transmission power Ph of the HeNB 300 is smaller than the transmission power Pm of the eNB 200 (No at step S201), the handover processing unit 214 recognizes transmission power to be increased in the HeNB 300 at the time of performing the femtocell control processing.

Specifically, when Ph+ΔP obtained by adding a predetermined power value ΔP to the transmission power Ph of the HeNB 300 is compared with the maximum transmission power Pmax of the HeNB 300, the handover processing unit 214 recognizes whether transmission power to be increased is Ph+ΔP or Pmax (Step S202). Here, ΔP is a predetermined power value determined based on a difference between the maximum transmission power Pmax and minimum transmission power Pmin of the HeNB 300. Specifically, ΔP is calculated as ΔP=(Pmax−Pmin)/n. A parameter n of this time may be a systematic parameter to determine the minimum transmission power to be increased or decreased as to the transmission power of the HeNB 300 and may be arbitrarily set.

When the transmission power Ph+ΔP of the HeNB 300 is smaller than the maximum transmission power Pmax of the HeNB 300 (No at step S202), the handover processing unit 214 sets to Ph+ΔP a target value of the transmission power of the HeNB 300 in the femtocell control processing. Next, the handover processing unit 214 compares the transmission power Ph+ΔP of the HeNB 300 and the transmission power Pm of the eNB 200 (Step S203). When Ph+ΔP is larger than or equal to Pm (Yes at step S203), the handover processing unit 214 determines that the femtocell control processing is performed.

When the transmission power Ph+ΔP of the HeNB 300 is larger than or equal to the maximum transmission power Pmax of the HeNB 300 (Yes at step S202), the handover processing unit 214 sets to Pmax a target value of the transmission power of the HeNB 300 in the femtocell control processing. Next, the handover processing unit 214 compares the maximum transmission power Pmax of the HeNB 300 and the transmission power Pm of the eNB 200 (Step S204). When Pmax is larger than or equal to Pm (Yes at step S203), the handover processing unit 214 determines that the femtocell control processing is performed.

When determining that the femtocell control processing is performed (Yes at step S203 or Yes at step S204), the handover processing unit 214 performs the femtocell control processing about the HeNB 300 by using the determined target value of the transmission power (Step S205). Note that, when determining that the femtocell control processing is not performed (Yes at step S201, No at step S203, or No at step S204), the handover processing unit 214 ends the process.

With regard to a relationship between received power pm from the eNB 200 measured at the UE 400 connected to the eNB 200 and received power ph from the HeNB 300, an example is illustrated in a graph of FIG. 16. Suppose here that when the transmission power of the eNB 200 is Pm, received power from the eNB 200 measured at the UE 400 is pm. Suppose further that when the transmission power of the HeNB 300 is Ph, received power from the HeNB 300 measured at the UE 400 is ph. The received power pm from the eNB 200 and the received power ph from the HeNB 300 are calculated based on the foregoing formula (1). Further, when the transmission power of the HeNB 300 is increased or decreased by $\Delta P$, an increasing or decreasing amount of the received power from the HeNB 300 measured at the UE 400 is described as $\delta p$. For example, when the transmission power of the HeNB 300 increases from Ph to Ph+$\Delta P$, the received power from the HeNB 300 measured at the UE 400 changes from ph to ph+$\delta p$.

At the start of the above-described femtocell control processing, when determining that the femtocell control processing is performed (Yes at step S203 or Yes at step S204 of FIG. 15), the eNB 200 being a handover source transmits the femtocell change request message M11 to the control apparatus 100. Through the operation unit 113 and the handover determination unit 114, the control apparatus 100 which receives the femtocell change request message M11 determines a mode of the femtocell control processing and determines whether the handover processing is performed. FIG. 17 is a flowchart illustrating a flow of the femtocell control processing through the control apparatus 100.

Based on the information according to the eNB 200 and HeNB 300, and the current position of the UE 400 according to the handover processing, the operation unit 113 of the control apparatus 100 which receives the handover information response message M22 calculates the average user data amount E(r) at this moment by using the foregoing formula (3). In either of the Ph+$\Delta P$ and the Pmax of the transmission power of the HeNB 300, the operation unit 113 further calculates the average user data amount E(r') at the time of changing transmission power to the target value of the transmission power determined based on the above-described process. The operation unit 113 describes as r1 a cell radius r' of the HeNB 300 according to the transmission power of the HeNB 300. The operation unit 113 compares the calculated E(r) and E(r1) (Step S301).

When E(r1) is larger than or equal to E(r) (Yes at step S301), the operation unit 113 transmits to the HeNB 300 the transmission power change request message M31 for increasing the transmission power Ph up to the target value Ph+$\Delta P$ or Pmax. According to transmission power information included in the message, the HeNB 300 which receives the transmission power change request message M31 increases the transmission power Ph and enlarges the cell area (Step S302). The control apparatus 100 then transmits to the eNB 200 or HeNB 300 the femtocell change response message M12 for performing handover processing about the UE 400 from the eNB 200 to the HeNB 300. According to information of the eNB/HeNB being a handover destination included in the message, the eNB 200 or HeNB 300 which receives the femtocell change response message M12 performs the handover processing about the UE 400 (Step S303).

On the other hand, when E(r1) is smaller than E(r) (No at step S301), the handover determination unit 114 determines that the handover processing about the UE 400 is not performed to the HeNB 300 and that connection of the UE 400 to the eNB 200 is continued. The operation unit 113 then proceeds to a process of reducing the cell area of the HeNB 300. Based on a cell radius r2 according to transmission power Ph−$\Delta P$ after the decrease in the case of decreasing the transmission power of the HeNB 300 by $\Delta P$, the operation unit 113 calculates the average user data amount E(r2) and compares E(r) and E(r2) (Step S304). After the comparison, when E(r2) is larger than or equal to E(r) (Yes at step S304), the operation unit 113 transmits to the HeNB 300 the transmission power change request message M31 for decreasing the transmission power Ph up to the target value Ph−$\Delta P$ in order to reduce the cell area (Step S305). When E(r2) is smaller than E(r) (No at step S304), the operation unit 113 does not instruct the HeNB 300 to change the transmission power, but ends the process.

(3-2) Process Example According to UE 400 Connected to HeNB 300

Figure 18:
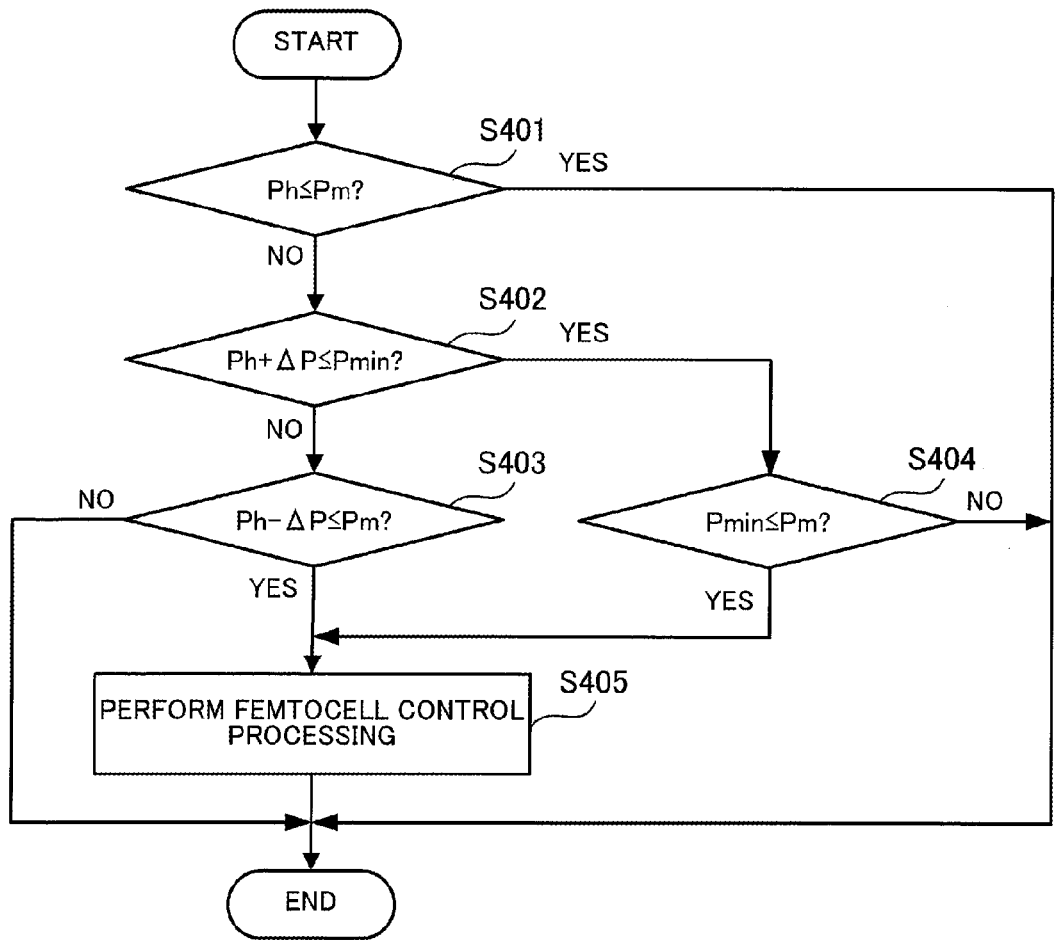
FIG. 18 is a flowchart illustrating a flow of operations of a control apparatus 100 according to handover processing.
Figure 19:
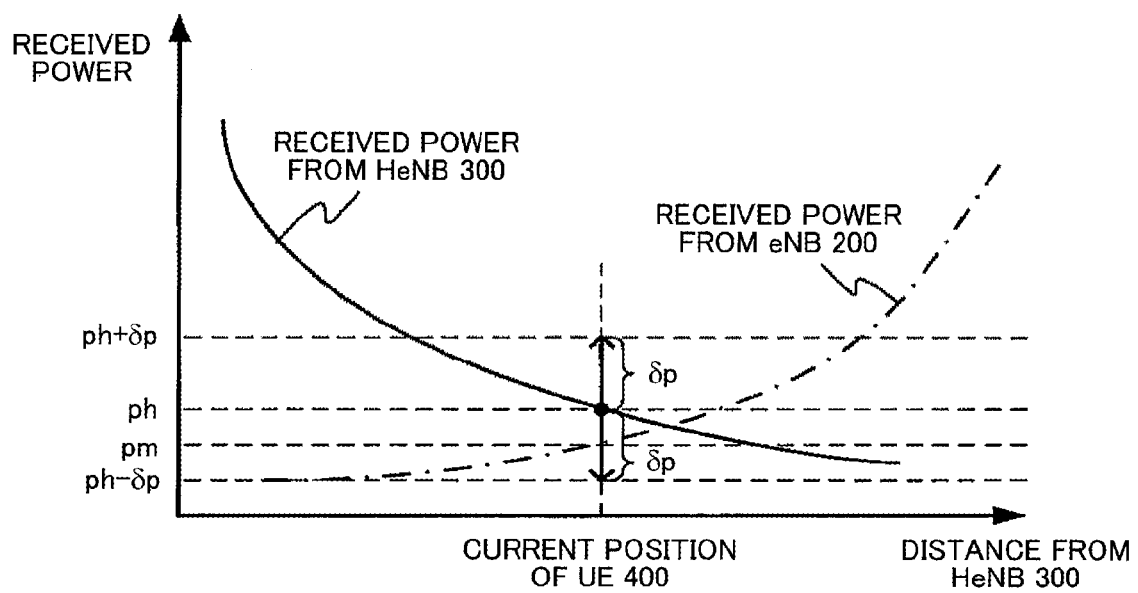
FIG. 19 is a graph illustrating received power from a base station observed in a mobile terminal.
Figure 20:
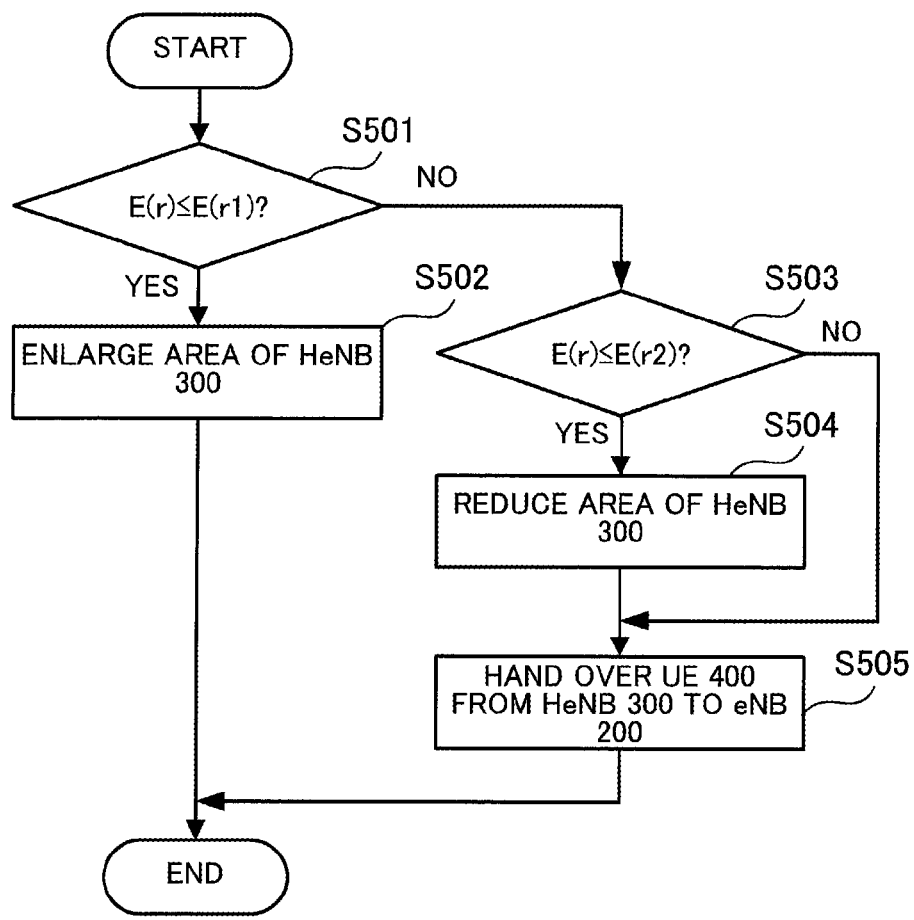
FIG. 20 is a flowchart illustrating a flow of operations of a control apparatus 100 according to femtocell control processing.

Referring to FIGS. 18 to 20, there will be described a process at the start of the femtocell control processing at the time when the UE 400 which is located in a cell of the HeNB 300 hands over to the eNB 200. FIG. 18 is a flowchart illustrating a flow of determination processing for starting the femtocell control processing through the handover processing unit 214 of the HeNB 300 being a handover source. The handover processing unit 214 of the HeNB 300 which receives the handover request message from the UE 400 present in a cell determines, based on a mode to be described below, whether to perform the femtocell control processing. For an information exchange, for example, the eNB 200 and HeNB 300 regularly report to each other values of the transmission power Pm of the eNB 200 and the maximum transmission power Pmax and minimum transmission power Pmin of the HeNB 300 used in calculations to be described below, or the cell radius R of the eNB 200 and cell radius r of the HeNB 300 used in the above-described calculations of each value.

The handover processing unit 214 of the HeNB 300 compares the transmission power Ph of the HeNB 300 and the transmission power Pm of the eNB 200 being a handover destination (Step S401). Based on the determination, the handover processing unit 214 determines whether to proceed to the femtocell control processing.

When the transmission power Ph of the HeNB 300 is smaller than or equal to the transmission power Pm of the eNB 200 (Yes at step S401), the handover processing unit 214 determines that the femtocell control processing is not needed in the UE 400, and ends the process.

When the transmission power Ph of the HeNB 300 is larger than the transmission power Pm of the eNB 200 (No at step S401), the handover processing unit 214 recognizes transmission power to be increased in the HeNB 300 at the time of performing the femtocell control processing.

Specifically, when Ph+$\Delta P$ obtained by adding a predetermined power value $\Delta P$ to the transmission power Ph of the HeNB 300 is compared with the minimum transmission power Pmin of the HeNB 300, the handover processing unit 214 recognizes whether transmission power to be increased is Ph+ΔP or Pmin (Step S402). In the same manner as in the above-described ΔP, ΔP is a predetermined power value determined based on a difference between the maximum transmission power Pmax and minimum transmission power Pmin of the HeNB 300.

When the transmission power Ph+ΔP of the HeNB 300 is larger than the minimum transmission power Pmin of the HeNB 300 (No at step S402), the handover processing unit 214 sets to Ph+ΔP a target value of the transmission power of the HeNB 300 in the femtocell control processing. Next, the handover processing unit 214 compares Ph−ΔP obtained by subtracting a power value ΔP from the transmission power Ph of the HeNB 300 and the transmission power Pm of the eNB 200 (Step S403). When Ph−ΔP is smaller than or equal to Pmin (Yes at step S403), the handover processing unit 214 determines that the femtocell control processing is performed.

When the transmission power Ph+ΔP of the HeNB 300 is smaller than or equal to the minimum transmission power Pmin of the HeNB 300 (Yes at step S402), the handover processing unit 214 sets to Pmin a target value of the transmission power of the HeNB 300 in the femtocell control processing. Next, the handover processing unit 214 compares the minimum transmission power Pmin of the HeNB 300 and the transmission power Pm of the eNB 200 (Step S404). When Pmin is smaller than or equal to Pm (Yes at step S404), the handover processing unit 214 determines that the femtocell control processing is performed.

When determining that the femtocell control processing is performed (namely, Yes at step S403 or Yes at step S404), the handover processing unit 214 performs the femtocell control processing about the HeNB 300 by using the determined target value of the transmission power (Step S405). Note that, when determining that the femtocell control processing is not performed (namely, Yes at step S401, No at step S403, or No at step S404), the handover processing unit 214 ends the process.

With regard to a relationship between received power pm from the eNB 200 measured at the UE 400 connected to the HeNB 300 and received power ph from the HeNB 300, an example is illustrated in a graph of FIG. 19. In FIG. 19, in the same manner as in FIG. 16, when the transmission power of the eNB 200 is Pm, received power from the eNB 200 measured at the UE 400 is described as pm. Further, when the transmission power of the HeNB 300 is Ph, received power from the HeNB 300 measured at the UE 400 is described as ph. Further, when the transmission power of the HeNB 300 is increased or decreased by ΔP, an increasing or decreasing amount of the received power from the HeNB 300 measured at the UE 400 is described as δp.

At the start of the above-described femtocell control processing, when determining that the femtocell control processing is performed (Yes at step S403 or Yes at step S404 of FIG. 18), the HeNB 300 being a handover source transmits the femtocell change request message M11 to the control apparatus 100. Through the operation unit 113 and the handover determination unit 114, the control apparatus 100 which receives the femtocell change request message M11 determines a mode of the femtocell control processing and determines whether the handover processing is performed. FIG. 20 is a flowchart illustrating a flow of the femtocell control processing through the control apparatus 100.

Based on the current position of the UE 400 according to the handover and the information according to the eNB 200 and HeNB 300, the operation unit 113 of the control apparatus 100 which receives the handover information response message M22 from the HeNB 300 calculates the average user data amount E(r) at this moment by using the foregoing formula (3). The operation unit 113 calculates the average user data amount E(r') at the time of changing to Ph+ΔP the target value of the transmission power of the HeNB 300, or at the time of changing to Pmin the target value of the transmission power of the HeNB 300. A cell radius r' of the HeNB 300 according to the transmission power after the change is described as r1. The operation unit 113 compares the calculated E(r) and E(r1) (Step S501).

When E(r1) is larger than or equal to E(r) (Yes at step S501), the handover determination unit 114 determines that the UE 400 does not hand over to the eNB 200 but continues connection to the HeNB 300. To enlarge the cell area, the operation unit 113 further transmits to the HeNB 300 the transmission power change request message M31 for increasing the transmission power Ph up to the target value Ph+ΔP or Pmax (Step S502).

On the other hand, when E(r1) is smaller than E(r) (No at step S501), the operation unit 113 proceeds to a process of reducing the cell area of the HeNB 300. Based on the cell radius r2 according to transmission power Ph−ΔP after the decrease in the case of decreasing the transmission power of the HeNB 300 by ΔP, the operation unit 113 calculates the average user data amount E(r2) and compares E(r) and E(r2) (Step S503). After the comparison, when E(r2) is larger than or equal to E(r) (Yes at step S503), the operation unit 113 transmits to the HeNB 300 the transmission power change request message M31 for decreasing the transmission power Ph up to the target value Ph−ΔP in order to reduce the cell area (Step S504). The handover determination unit 114 then performs the handover processing about the UE 400 from the HeNB 300 to the eNB 200 (Step S505).

When E(r2) is smaller than E(r) (No at step S503), the operation unit 113 does not instruct the HeNB 300 to change the transmission power. The handover determination unit 114 further performs handover processing about the UE 400 from the HeNB 300 to the eNB 200 (Step S505).

(4) Description of Effects

As can be seen from the above description, at the time of the handover processing about the UE 400, the control apparatus 100 performs an operation according to the average user data amount to be transmitted to all of the UEs 400 which are located in the cell area of the eNB 200 including the cell area of the HeNB 300. According to the operation results, the control apparatus 100 further performs the femtocell control processing of changing the transmission power Ph of the HeNB 300.

Figure 21:
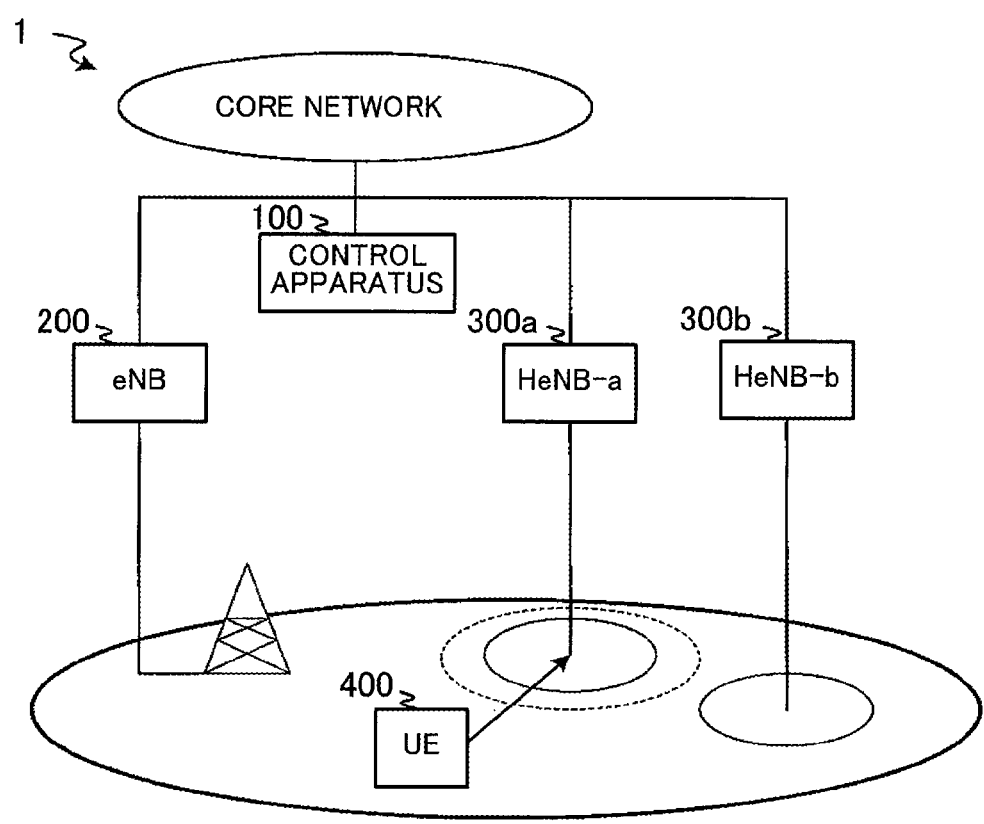
FIG. 21 illustrates a change in a radius of a cell area of a base station according to femtocell control processing.
Figure 22:
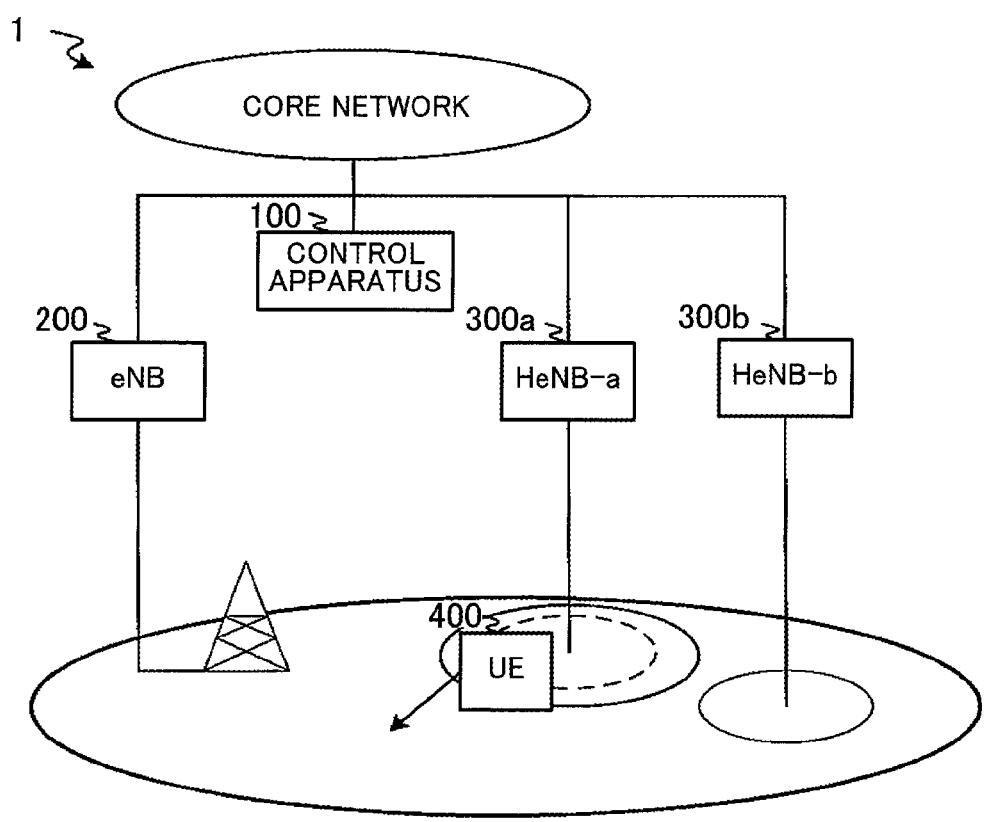
FIG. 22 illustrates a change in a radius of a cell area of a base station according to femtocell control processing.
Figure 23:
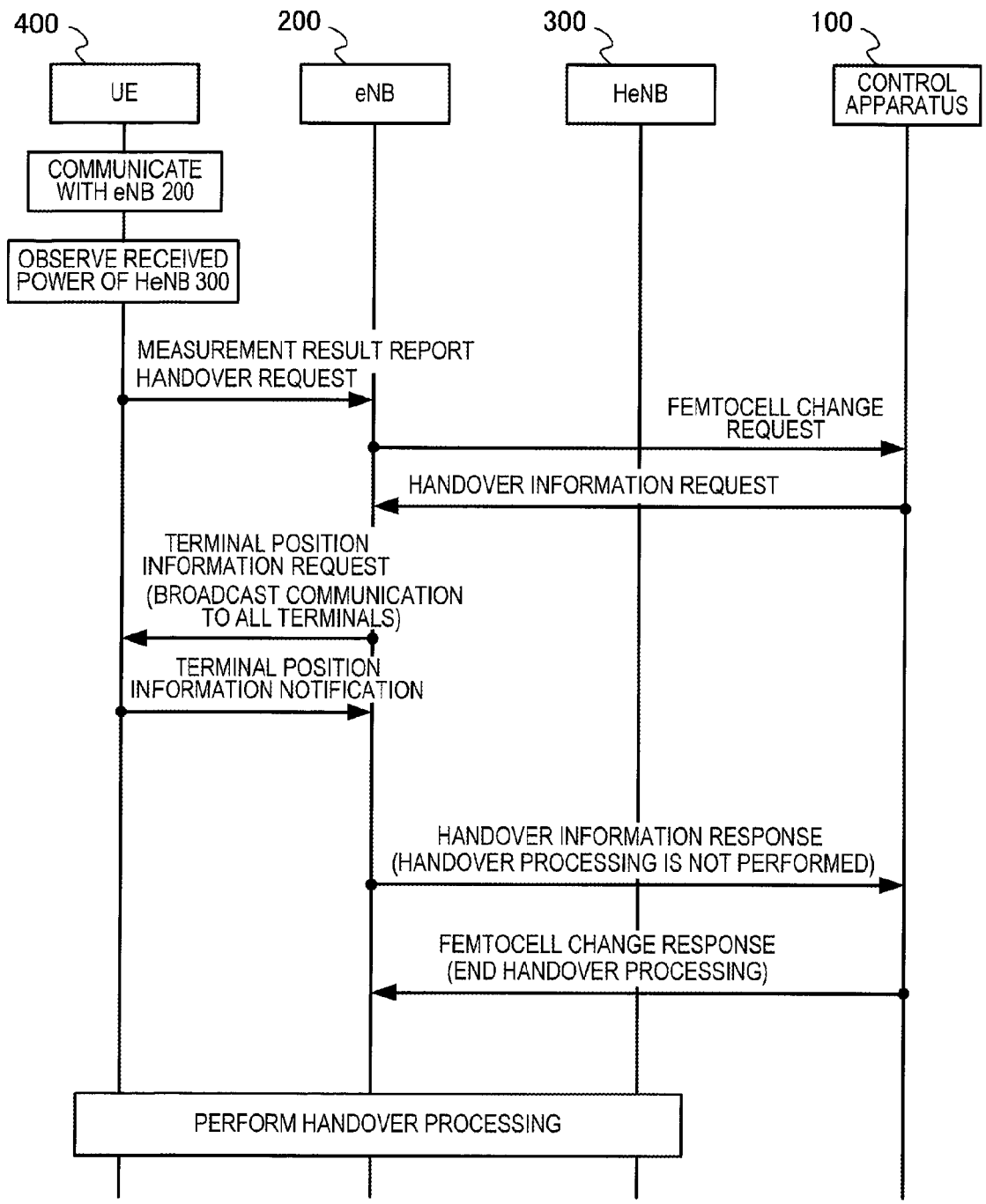
FIG. 23 is a sequence diagram illustrating a flow of a process in the case where handover processing is not performed.

When the transmission power Ph of the HeNB 300 is changed, the radius r of the cell area of the HeNB 300 is also changed. Specifically, when the transmission power Ph increases, the radius r of the cell area of the HeNB 300 is enlarged, whereas when the transmission power Ph decreases, the radius r of the cell area of the HeNB 300 is reduced. With regard to the above-described change in the radius r of the cell area of the HeNB 300, an example is illustrated in FIGS. 21 and 22.

For example, when the UE (i) connected to the eNB 200 hands over to the HeNB 300, the control apparatus 100 compares a value E(r) before the change and a value E(r1) after the change as to the average user data amount in the case of performing control to increase the transmission power Ph of the HeNB 300. When the average user data amount E(r1) after the change is predicted to be larger than or equal to the value E(r) before the change, the control apparatus 100 performs the femtocell control processing of increasing the transmission power Ph of the HeNB 300. Therefore, when the UE (i)

connected to the eNB 200 hands over to the HeNB 300, the control apparatus 100 does not increase interference to the other UEs 400 but definitely performs the handover processing.

On the other hand, when the average user data amount E(r1) after the change is predicted to be smaller than the value E(r) before the change, the control apparatus 100 does not perform handover processing about the UE (i) and perform control to increase the transmission power Ph of the HeNB 300. At this time, the control apparatus 100 compares the value E(r) before the change and the average user data amount E(r2) in the case of performing control to decrease the transmission power Ph of the HeNB 300. When the average user data amount E(r2) after the change is predicted to be larger than or equal to the value E(r) before the change, the control apparatus 100 performs control to decrease the transmission power of the HeNB 300. Therefore, when the UE (i) connected to the eNB 200 fails to hand over to the HeNB 300 and continues the connection to the eNB 200, the control apparatus 100 does not increase interference to the other UEs 400 but decreases interference due to transmission radio waves from the HeNB 300.

According to the above-described femtocell control processing, also when the UE 400 connected to the HeNB 300 hands over to the eNB 200, the same effect is obtained.

For example, when a UE (j) connected to the HeNB 300 hands over to the eNB 200, the control apparatus 100 compares a value E(r) before the change and a value E(r1) after the change as to the average user data amount in the case of performing control to increase the transmission power Ph of the HeNB 300. When the average user data amount E(r1) after the change is predicted to be larger than or equal to the value E(r) before the change, the control apparatus 100 performs the femtocell control processing of increasing the transmission power Ph of the HeNB 300. At this time, since an increase in a prediction value of the average user data amount is confirmed, the control apparatus 100 does not increase an influence of interference to the other UEs 400 which are located in the cell area of the eNB 200, but increases the transmission power Ph of the HeNB 300. When the transmission power Ph of the HeNB 300 is increased, since received power from the HeNB 300 in the UE 400 increases according to the handover processing, the handover to the eNB 200 is not needed. Therefore, the handover processing itself is ended. Accordingly, connection of the UE 400 to the HeNB 300 is preferably maintained. Further, the eNB 200 is requested to be connected to a relatively large number of UEs 400 and radio resources of the eNB 200 are assumed to be efficiently utilized. When the UE 400 according to the handover processing further moves in a cell edge direction, received power from the HeNB 300 may be observed to be decreased. In this case, a study whether handover processing about the UE 400 is performed is made.

On the other hand, when the average user data amount E(r1) after the change is predicted to be smaller than the value E(r) before the change, the control apparatus 100 does not perform control to increase the transmission power Ph of the HeNB 300. At this time, the control apparatus 100 compares the value E(r) before the change and the average user data amount E(r2) in the case of performing control to decrease the transmission power Ph of the HeNB 300. When the average user data amount E(r2) after the change is predicted to be larger than or equal to the value E(r) before the change, the control apparatus 100 performs control to decrease the transmission power Ph of the HeNB 300. The control apparatus 100 then performs handover processing about the UE (j) to the eNB 200. Therefore, after a UE (j) connected to the HeNB 300 hands over to the eNB 200, the control apparatus 100 suppresses an influence of interference due to transmission radio waves from the HeNB 300 to the UE (j). At this time, since an increase in a prediction value of the average user data amount is confirmed, the control apparatus 100 does not increase an influence of interference to the other UEs 400.

Further, when the average user data amount E(r2) after the change is predicted to be smaller than the value E(r) before the change, the control apparatus 100 does not perform control to decrease the transmission power Ph of the HeNB 300.

In the above-described example, as to the average user data amount E(r) to be transmitted to all of the UEs 400 which are located in the cell area of the eNB 200 before and after the femtocell control processing, the operation unit 113 of the control apparatus 100 determines based on the predicted change whether the femtocell control processing is performed and determines a mode thereof. As indicated in the formula (3), the average user data amount E(r) is represented as a function of a signal-to-interference ratio Q (Ri, R, ri, r) from the eNB 200 and HeNB 300 to each UE 400. Accordingly, based on the signal-to-interference ratio Q of all the UEs 400, the operation unit 113 of the control apparatus 100 may determine whether the femtocell control processing is performed and determine a mode thereof in place of the average user data amount E(r) before and after the femtocell control processing is performed. In the case where the transmission power Ph of the HeNB 300 increases, for example, when an increase in an average signal-to-interference ratio of all the UEs 400 which are located in the cell area of the eNB 200 is confirmed, an influence of interference to the UEs 400 is considered to be not increased due to the increase in the transmission power.

As indicated in the formulas (1) to (3), in the embodiments, the received power, signal-to-interference ratio, and transmitted user data amount of the UE 400 from the eNB 200 or HeNB 300 are represented as a function of a distance from the UE 400 to the eNB 200 or HeNB 300. Accordingly, when the control apparatus 100 performs the femtocell control processing without accurately grasping position information of the UE 400, calculation accuracy of the average user data amount E(r) may be deteriorated and control to increase interference may be performed.

When a predetermined threshold is set to a GPS measurement error to be transmitted from the UE 400 and the measurement error is observed to be larger than the threshold, the control apparatus 100 may terminate the femtocell control processing based on a prediction value of the average user data amount E(r), or the handover processing itself about the UE 400 in which the measurement error is observed.

In an example described with reference to FIG. 13, the GPS measurement error to be observed is supposed to be larger than 0.1R as to position information from the UE 400 according to the handover processing. In this case, the handover determination unit 114 of the control apparatus 100 determines that measurement accuracy of positions of the UE 400 is not sufficiently high and the handover processing is not performed. Also in addition to a value of 10% of the above-described cell radius, the threshold of the GPS measurement error may be set to a suitable value by using some methods such as simulations.

(5) Operations of Modifications

Operations of a modification performed by the control apparatus 100 will be described. In the embodiment described with reference to FIG. 8, for performing the femtocell control processing, the control apparatus 100 which receives the femtocell change request message M11 transmits the handover information request message M21 to the predetermined eNB 200 and HeNB 300. After the terminal position information request and response messages M41 and M42 are exchanged according to the message, the eNB 200 and HeNB 300 each send back the handover information response message M22 to the control apparatus 100. When the above-described handover processing about the UE 400 is congested, communication of vast amount of information is performed for exchange of the messages. Through the process, an influence is considered to be exerted on traffic in the mobile communication system 1.

According to operations of the modification, when the handover information response message M22 is received from the eNB 200 and HeNB 300 as illustrated in FIG. 8, the control apparatus 100 stores contents and receipt time of the messages in a database of the memory 103. FIG. 24 illustrates one example of a table stored in the database. FIG. 24A illustrates an example of the table for storing information about the UE 400 included in the handover information response message M22. In the table which stores the information about the UE 400, the position information, average user data amount, and specific information and receipt time of the eNB 200 during communication are stored for each UE 400. FIG. 24B illustrates an example of the table for storing information about the eNB 200 or HeNB 300 being a transmission source of the message included in the handover information response message M22. The table which stores information about the eNB 200 or HeNB 300 stores position information and transmission power of each of the eNB 200 and HeNB 300. The above-described table further stores information for specifying the eNB 200 overlaid with the cell area of the HeNB 300, in other words, located on the higher level thereof.

According to operations of the modification, when receiving the femtocell change request message M11, in place of transmitting the handover information request message M22, the control apparatus 100 refers to the database in the memory 103 and recognizes whether information available for handover processing is stored. The control apparatus 100 determines that the message is available for the handover processing for a predetermined period from the time of receiving the message stored in the database.

Figure 25:
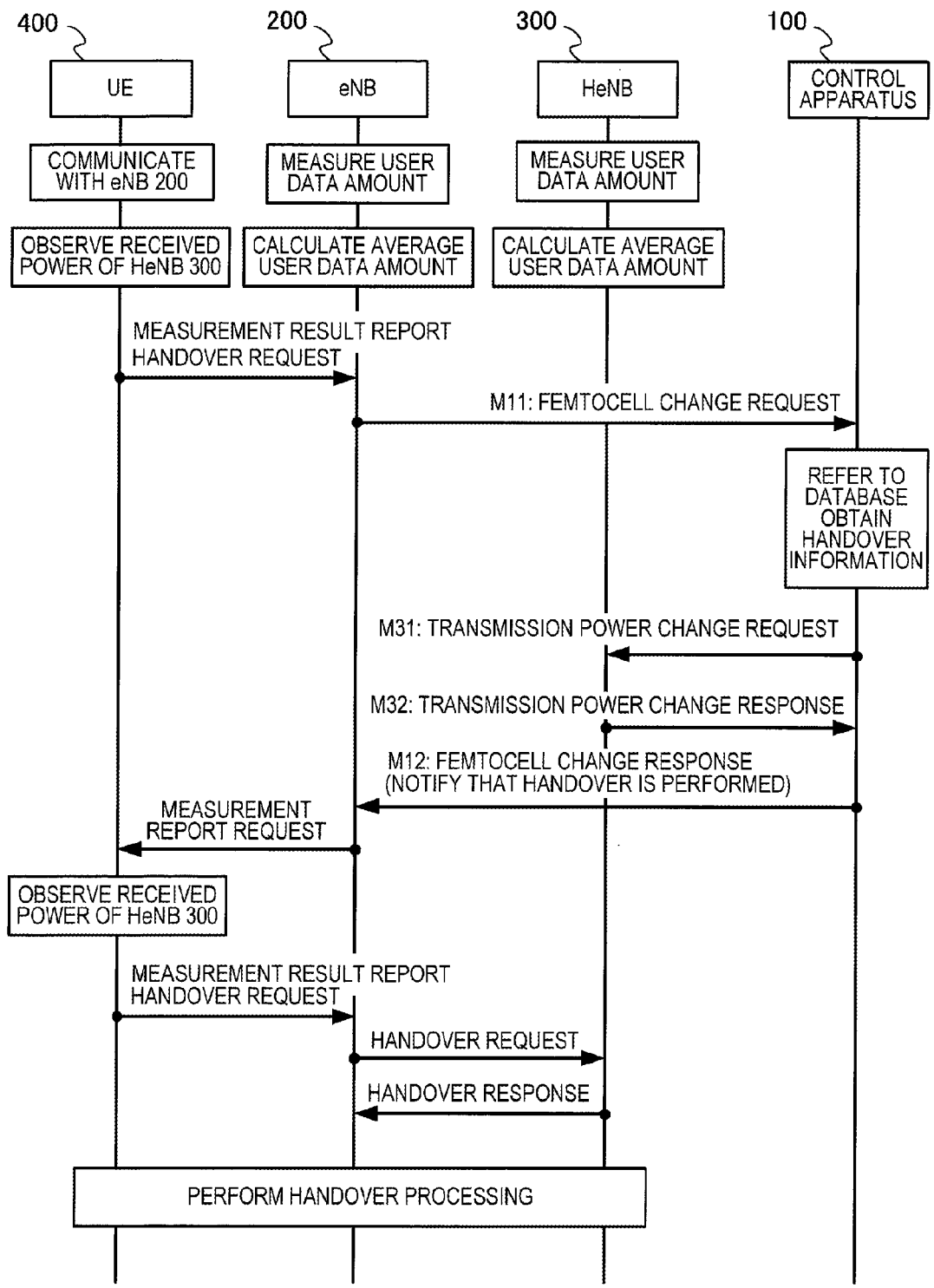
FIG. 25 is a sequence diagram illustrating operations of each unit according to a modification embodiment.

When information available for the handover processing is stored, the control apparatus 100 performs the handover processing and femtocell control processing based on the information. A sequence of this time is illustrated in FIG. 25. From the database stored in the memory 103, the operation unit 113 and handover determination unit 114 of the control apparatus 100 extract the position information and user data amount of the UE 400, and perform the same processes as those of the above-described embodiments.

On the other hand, when the information available for the handover processing is not stored, the control apparatus 100 transmits the handover information request message M21 to the eNB 200 and HeNB 300 in the same manner as in the above-described embodiments. When the handover information response message M22 is received for the handover information request message M21, the control apparatus 100 then updates the database in the memory 103 based on the information included in the message.

According to operations of the modification, the control apparatus 100 does not necessarily communicate the handover information request message M21 and the handover information response message M22 as to individual handover processing, but obtains information used in the handover processing. When requests for handover processing from a plurality of the UEs 400 are congested, the control apparatus 100 obtains information used in the handover processing about one UE 400. The control apparatus 100 performs handover processing about the other UEs 400 by using the information stored in the memory 103 and realizes suppression of large traffic volume.

As a further modification, the control apparatus 100 may regularly receive a notification of information about the handover processing from the eNB 200 and HeNB 300.

According to this aspect, the control apparatus 100 transmits the handover information request message M21 at a given period to the eNB 200 and all the HeNBs 300 in cells arranged so as to be overlaid with the cell area of the eNB 200. When the terminal position information request message M41 is transmitted to the UE 400, the eNB 200 and HeNB 300 which receive the handover information request message M21 collect information. The eNB 200 and HeNB 300 create the handover information response message M22 including the collected information and transmit the message to the control apparatus 100. When the handover information response message M22 is received, the control apparatus 100 stores information included in the message in the database of the memory 103.

Figure 26:
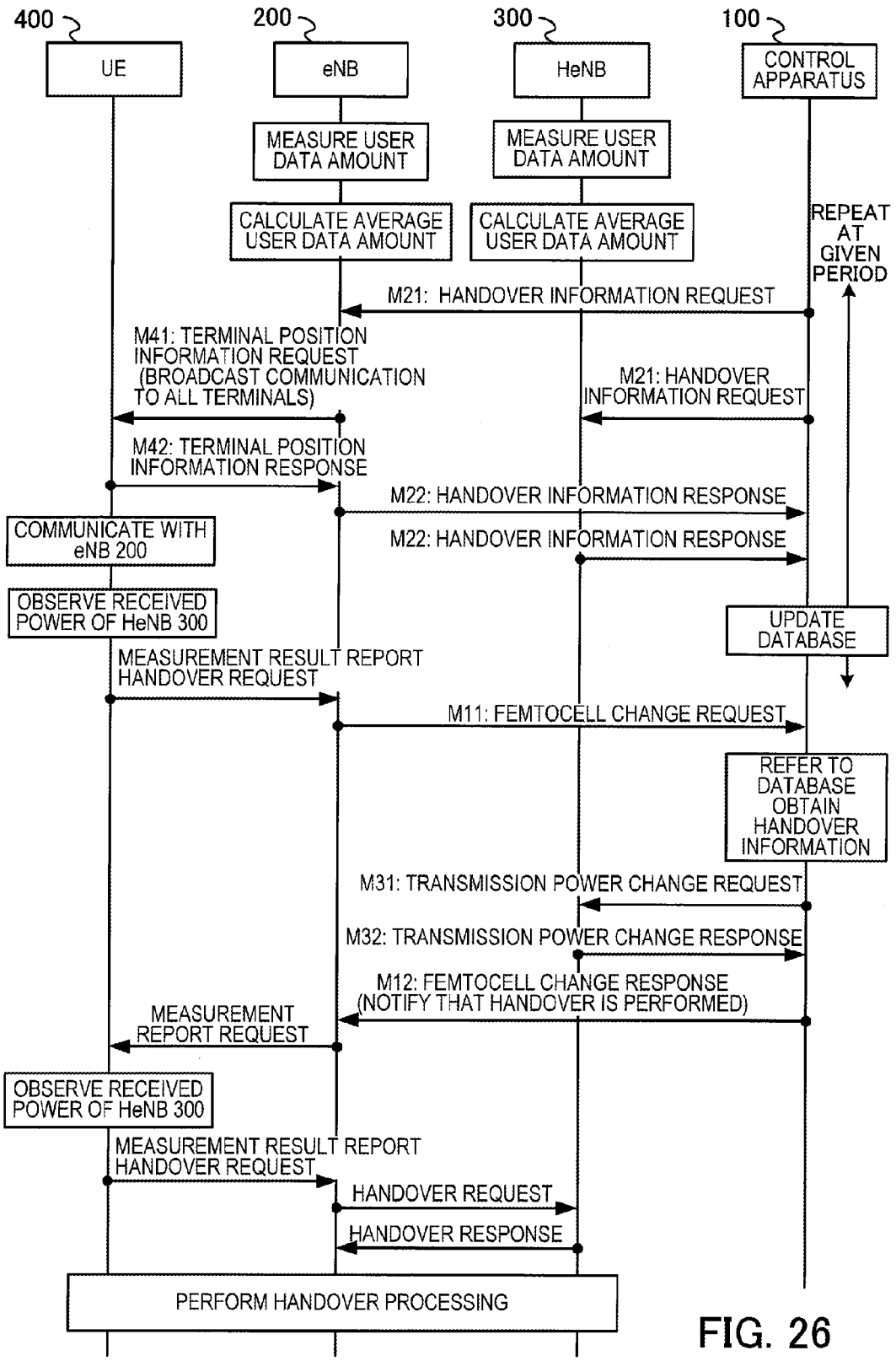
FIG. 26 is a sequence diagram illustrating operations of each unit according to a modification embodiment.

When the femtocell change request message M11 is received from the eNB 200 or HeNB 300, in place of transmitting the handover information request message M21, the control apparatus 100 refers to the database stored in the memory 103 and takes out the stored information about the handover processing. A sequence of this time is illustrated in FIG. 26.

According to this aspect, for example, when the handover information request message M21 is transmitted to the eNB 200 and HeNB 300 at a given period according to a validated date of the stored information, the control apparatus 100 collects information again and updates the database. Accordingly, the control apparatus 100 does not transmit the handover information request message M21 at the time of handover request from the UE 400, but preferably uses the information stored in the database of the memory 103 to perform the handover processing.

According to the above-described configuration, for example, in an area of a mobile communication system in which a first base station being a macrocell base station and a second base station being a femtocell base station are mixed, at the time of handover of one mobile terminal, the control apparatus suppresses deterioration of an interference amount given from the second base station to the other mobile terminals. Without deteriorating an interference amount, the control apparatus further changes transmission power from the second base station according to a mode of the handover and accurately performs handover processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A control apparatus to control operations with a first base station which forms a first radio section and communicates with a mobile terminal, and a second base station which forms a second radio section that is overlaid with the first radio section and is relatively lower than the first radio section in transmission power and communicates with the mobile terminal, the control apparatus comprising:
- a connection change determination unit which determines whether to perform connection in response to a change request of a connection destination from the mobile terminal;
- a measurement unit which measures communication conditions from the first or second base station about all of mobile terminals located in the first radio section and which obtains a measurement value of a first communication condition about a first mobile terminal located in the first radio section;
- a change value determination unit which determines a change value of transmission power of the second base station;
- a prediction unit which predicts a second communication condition about a second mobile terminal located in the second radio section after the transmission power of the second base station is changed based on the change value and which generates a prediction value of the second communication condition; and
- a power change unit which changes the transmission power of the second base station based on the change value,
- wherein when the mobile terminal changes a connection destination between the first and second base stations, the power change unit changes the transmission power of the second base station according to a comparison result of the measurement value and the prediction value.

2. The control apparatus according to claim 1, wherein:
the change value determination unit determines the change value so as to be higher than transmission power of the second base station before change; and
upon detecting that the prediction value is larger than or equal to the measurement value when the mobile terminal changes a connection destination from the first base station to the second base station, the power change unit increases the transmission power of the second base station based on the change value.

3. The control apparatus according to claim 1, wherein:
the change value determination unit determines the change value so as to be lower than the transmission power of the second base station before change; and
upon detecting that a connection destination of the mobile terminal is not possible to be changed and the prediction value is larger than or equal to the measurement value when the mobile terminal changes a connection destination from the first base station to the second base station, the power change unit decreases the transmission power of the second base station based on the change value.

4. The control apparatus according to claim 1, wherein:
the change value determination unit determines the change value so as to be lower than transmission power of the second base station before change; and
upon detecting that the prediction value is larger than or equal to the measurement value when the mobile terminal changes a connection destination from the second base station to the first base station, the power change unit decreases the transmission power of the second base station based on the change value.

5. The control apparatus according to claim 1, wherein:
the change value determination unit determines the change value so as to be higher than transmission power of the second base station before change; and
upon detecting that a connection destination of the mobile terminal is not possible to be changed and the prediction value is larger than or equal to the measurement value when the mobile terminal changes a connection destination from the second base station to the first base station, the power change unit increases the transmission power of the second base station based on the change value.

6. The control apparatus according to claim 1, wherein the first and second communication conditions represent information indicating interference from the second base station to all of the mobile terminals which are located in the first radio section.

7. The control apparatus according to claim 1, wherein the first and second communication conditions represent information indicating a communication amount from the first or second base station to all of the mobile terminals which are located in the first radio section.

8. A control method for controlling operations with a first base station which forms a first radio section and communicates with a mobile terminal, and a second base station which forms a second radio section that is overlaid with the first radio section and is relatively lower than the first radio section in transmission power and communicates with the mobile terminal, the control method comprising:
- a connection change determination step of determining whether to perform connection in response to a change request of a connection destination from the mobile terminal;
- a measurement step of measuring communication conditions from the first or second base station about all of mobile terminals located in the first radio section and obtaining a measurement value of a first communication condition about a first mobile terminal located in the first radio section;
- a change value determination step of determining a change value of transmission power of the second base station;
- a prediction step of predicting a second communication condition about a second mobile terminal located in the second radio section after the transmission power of the second base station is changed based on the change value and generating a prediction value of the second communication condition; and
- a power change step of changing the transmission power of the second base station based on the change value,
- wherein in the power change step, when the mobile terminal changes a connection destination between the first and second base stations, the transmission power of the second base station is changed according to a comparison result of the measurement value and the prediction value.

9. A mobile communication system comprising:
- a first base station configured to form a first radio section and communicate with a mobile terminal;
- a second base station configured to form a second radio section that is overlaid with the first radio section and is relatively lower than the first radio section in transmission power and communicate with the mobile terminal; and
- a control apparatus, wherein:
the control apparatus includes:
a connection change determination unit which determines whether to perform connection in response to a change request of a connection destination from the mobile terminal;
a measurement unit which measures communication conditions from the first or second base station about all of mobile terminals located in the first radio section and which obtains a measurement value of a first communication condition about a first mobile terminal located in the first radio section;

a change value determination unit which determines a change value of transmission power of the second base station;

a prediction unit which predicts a second communication condition about a second mobile terminal located in the second radio section after the transmission power of the second base station is changed based on the change value and which generates a prediction value of the second communication condition; and a power change unit which changes the transmission power of the second base station based on the change value, wherein when the mobile terminal changes a connection destination between the first and second base stations, the power change unit changes the transmission power of the second base station according to a comparison result of the measurement value and the prediction value.

* * * * *